United States Patent
Theriappan et al.

(10) Patent No.: US 12,182,512 B2
(45) Date of Patent: Dec. 31, 2024

(54) MACHINE LEARNING METHODS AND SYSTEMS FOR EXTRACTING ENTITIES FROM SEMI-STRUCTURED ENTERPRISE DOCUMENTS

(71) Applicant: TAO Automation Services Private Limited, Bangalore (IN)

(72) Inventors: Hariharamoorthy Theriappan, Bangalore (IN); Amit Rajan, Ranchi (IN); Nagaraju Pappu, Bangalore (IN); Jawahar Bekay, Bengaluru (IN)

(73) Assignee: TAO AUTOMATION SERVICES PRIVATE LIMITED, Bangalore (IN)

( * ) Notice: Subject to any disclaimer, the term of this patent is extended or adjusted under 35 U.S.C. 154(b) by 410 days.

(21) Appl. No.: 17/677,868

(22) Filed: Feb. 22, 2022

(65) Prior Publication Data

US 2023/0267273 A1    Aug. 24, 2023

(51) Int. Cl.
*G06F 40/284* (2020.01)
*G06F 40/117* (2020.01)
*G06N 5/022* (2023.01)

(52) U.S. Cl.
CPC .......... *G06F 40/284* (2020.01); *G06F 40/117* (2020.01); *G06N 5/022* (2013.01)

(58) Field of Classification Search
CPC ...... G06F 40/284; G06F 40/117; G06N 5/022
USPC ................. 704/231, 238–240, 251
See application file for complete search history.

(56) References Cited

U.S. PATENT DOCUMENTS

| | | |
|---|---|---|
| 8,458,186 B2 | 6/2013 | Stringham et al. |
| 10,489,439 B2 | 11/2019 | Calapodescu et al. |
| 10,489,502 B2 | 11/2019 | Priestas et al. |
| 10,956,786 B2 | 3/2021 | Tecuci et al. |
| 2019/0005012 A1* | 1/2019 | Priestas .................. G06N 20/00 |
| 2022/0043871 A1* | 2/2022 | Prasad .............. G06F 16/90328 |
| 2022/0156300 A1* | 5/2022 | Paruchuri .............. G06V 10/82 |

* cited by examiner

*Primary Examiner* — George C Monikang
(74) *Attorney, Agent, or Firm* — Evergreen Valley Law Group; Kanika Radhakrishnan

(57) ABSTRACT

Embodiments of the present disclosure provide systems and methods for extracting entities from semi-structured enterprise documents. The method performed by a server system includes receiving an enterprise document in a semi-structured format. The method includes extracting document features from the enterprise document. The document features include structural, token-specific, and entity-specific features. Further, the method includes identifying candidate entities in the enterprise document based at least on a machine learning model which uses document features. The candidate entities include candidate tabular entities and candidate non-tabular entities. The method includes computing probability scores for the one or more tokens-corresponding to the candidate non-tabular entities and the candidate tabular entities, based at least on the machine learning model. The method includes extracting structured data from the enterprise document according to the candidate non-tabular and tabular entities based at least on the probability scores.

20 Claims, 12 Drawing Sheets

MACHINE LEARNING METHODS AND SYSTEMS FOR EXTRACTING ENTITIES FROM SEMI-STRUCTURED ENTERPRISE DOCUMENTS

TECHNICAL FIELD

The present disclosure relates to methods and systems for extracting information from enterprise documents and, more particularly to, machine learning (ML) based systems and methods for extracting the structured information from semi-structured enterprise-specific documents.

BACKGROUND

In recent times, there have been various kinds of implementations of machine learning (ML) techniques into computer-related machines, for extracting information and/or data from various data sources such as World Wide Web, articles, documents in unstructured or semi-structured formats, etc. The information extraction from the various data sources minimizes the manual time of data entry, data correction, eliminates multiple process bottlenecks in a workflow.

Conventionally, extraction algorithms such as rule-based extraction and template-based extraction (or reverse document automation) were used for extracting information from the data sources (e.g., documents). Typically, rule-based extraction and template-based extraction use traditional artificial intelligence (AI) methods for extracting information (i.e. semantic and non-semantic information) from the documents. However, the conventional extraction algorithms rely on simple assumptions about information, for example, an assumption on table cell format, position of headers, arrangement of letters and words, etc. The use of such extraction algorithms may not lead to the extraction of information from the documents with optimum accuracy. Accordingly, such extraction algorithms may not lead to robust solutions when there is a deviation in the position of the information in the documents (i.e. unknown format). To overcome the aforementioned problem, the conventional extraction algorithms tend to undergo custom implementations for extracting the information from unknown documents (or documents of multiple formats), or from individual data sources. However, the custom implementations associated with the extraction algorithms are difficult to build and maintain. Further, the use of custom implemented extraction algorithms for extracting information from the documents may be time-consuming and error-prone.

Thus, there exists a need for technical solutions for extracting information from documents with high accuracy that requires less maintenance.

SUMMARY

Various embodiments of the present disclosure provide machine learning (ML) based systems and methods for extracting the structured information from semi-structured enterprise-specific documents.

In an embodiment, a computer-implemented method is disclosed. The computer-implemented method performed by a server system includes receiving an enterprise document in a semi-structured format from a user. The enterprise document includes one or more tokens. The computer-implemented method includes extracting document features from the enterprise document. The document features include structural, token-specific, and entity-specific features. Further, the computer-implemented method includes identifying candidate entities in the enterprise document based, at least in part, on a machine learning model which uses document features. The candidate entities include candidate tabular entities and candidate non-tabular entities obtained from the one or more tokens in the enterprise document. The computer-implemented method further includes computing probability scores for the one or more tokens corresponding to the candidate non-tabular entities and the candidate tabular entities, based, at least in part, on the machine learning model. The computer-implemented method includes extracting structured data from the enterprise document according to the identified candidate non-tabular entities and candidate tabular entities based, at least in part, on the probability scores.

In another embodiment, a server system is disclosed. The server system includes a communication interface, a memory comprising executable instructions, and a processor communicably coupled to the communication interface and the memory. The processor is configured to cause the server system to perform at least receive an enterprise document in a semi-structured format from a user. The enterprise document includes one or more tokens. The server system is caused to extract document features from the enterprise document. The document features include structural, token-specific, and entity-specific features. The server system is further caused to identify candidate entities in the enterprise document based, at least in part, on a machine learning model which uses document features. The candidate entities include candidate tabular entities and candidate non-tabular entities that are obtained from the one or more tokens in the enterprise document. Further, the server system is caused to compute probability scores for the one or more tokens corresponding to the candidate non-tabular entities and the candidate tabular entities, based, at least in part, on the machine learning model. The server system is caused to extract structured data from the enterprise document according to the identified candidate non-tabular entities and candidate tabular entities based, at least in part, on the probability scores.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

Figure 1:
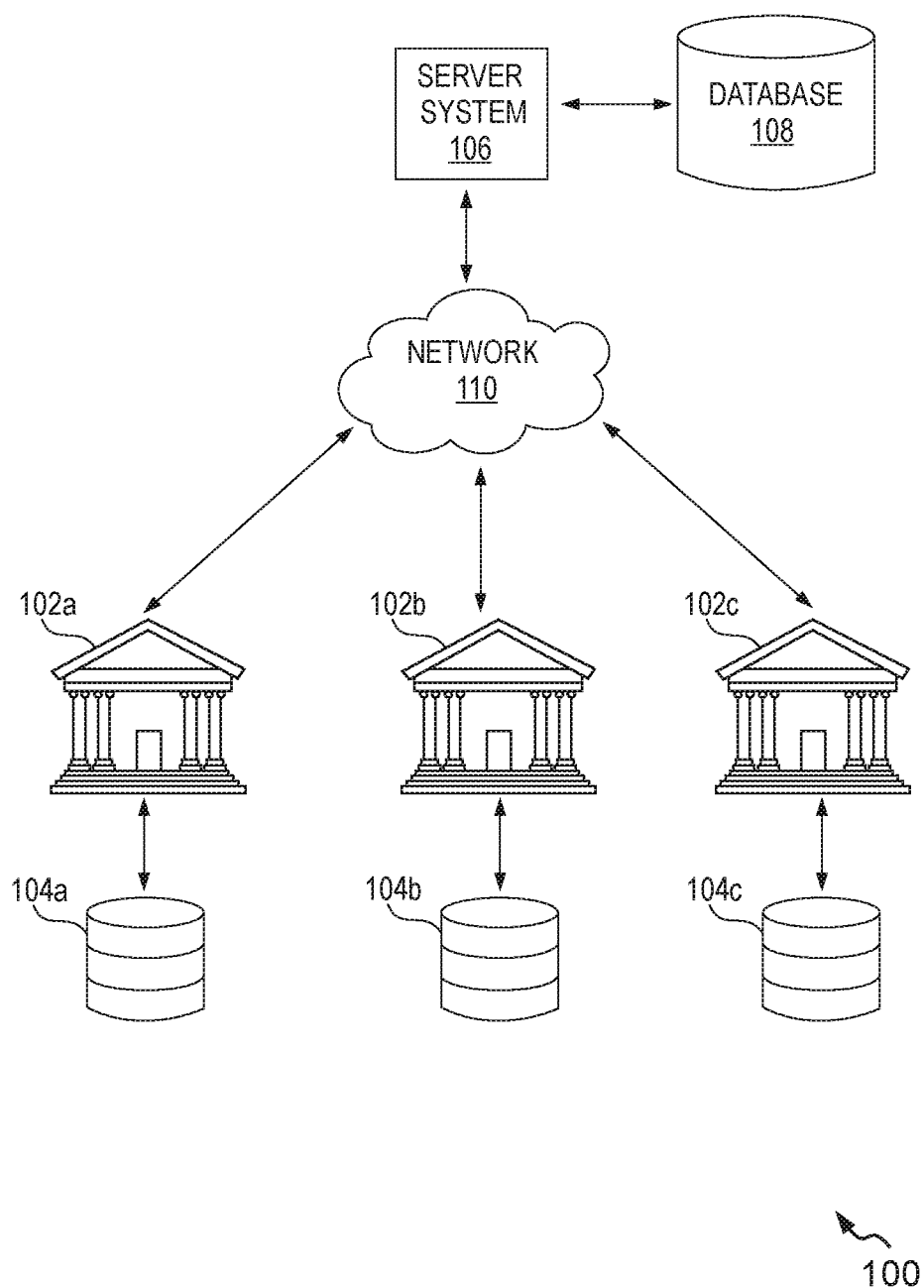
FIG. 1 illustrates an exemplary representation of an environment related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The present disclosure provides a technical solution to one or more problems stated herein. Typically, extracting non-semantic information (or entities) from the enterprise documents may be erroneous due to the lack of natural language processing (NLP) techniques in traditional systems. In some cases, the entities may be positioned at various places in the document that is in an unstructured format or a semi-structured format (for example, invoices). The traditional systems may be integrated with optical character recognition (OCR) applications for extracting the entities in the documents that are present in the unstructured and semi-structured formats. But the traditional systems integrated with the OCR applications may provide poor, or unpredictable results in such documents (i.e. the documents in the unstructured and semi-structured formats). Therefore, prediction confidence (or prediction accuracy) for the extraction of the entities from such documents may be poor. Further, the documents may be specific to each enterprise. In such a scenario, the traditional systems may be designed to be a generic system with high prediction accuracy for extracting the entities from the documents associated with each enterprise. In addition, since such documents contain proprietary and confidential data of the enterprise, the enterprise may not share these documents with technology or solution partners for training purposes to design the generic system.

Various embodiments of the present invention are described hereinafter with reference to FIG. 1 to FIG. 7.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, automatically extracting information and/or data from semi-structured documents. The environment 100 generally includes a plurality of entities, for example, a plurality of enterprises such as an enterprise 102a, an enterprise 102b and an enterprise 102c, and a server system 106, each coupled to, and in communication with (and/or with access to) a network 110. The network 110 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 110 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 110 may include multiple different networks, such as a private network made accessible by the server system 106, separately, and a public network (e.g., the Internet).

Examples of the enterprises 102a-102c may be organizations, file publishers, etc. The enterprises 102a-102c may store enterprise documents in enterprise repositories 104a, 104b, and 104c, respectively. Examples of the enterprise documents may include, but are not limited to, relatively large technical manuals, legal documents, product descriptions, invoices or the like. More specific examples might include engineering manuals that specify repair procedures (e.g., in the vehicle context, procedures for repairing, servicing, or refurbishing parts or assembled systems from a vehicle), that provide technical information in tabular form, or non-tabular form, or the like. The enterprise document may be semi-structured in the sense that they typically include a table of contents, indexes, or other forms of organization, thus, the term "semi-structured." Examples of these semi-structured documents may include parts catalogs, maintenance manuals, service documents, invoices or the like. In some cases, these documents may be generated from databases, with manual processes refining the format or layout of these documents. Examples of the latter scenarios may include telephone books, directory listings, or the like, as well as the examples provided above.

In some implementations, these enterprise documents may be published in the portable document format (PDF) created by Adobe Systems Incorporated. However, implementations of the systems in the environment 100 may operate with other equivalent or similar document formats. Typically, these formats are assigned more for ease of portability and exchange between a variety of different operating environments and application programs, or are not well-adapted for searching, indexing, or otherwise locating information within these documents. In cases where these documents include dozens or hundreds of pages, it can be time-consuming and laborious to scroll through such lengthy documents to locate particular information.

In one embodiment, the server system 106 is configured to perform one or more of the operations described herein. The server system is a data extraction system for extracting entities from enterprise documents. In one example, the server system 106 is an enterprise-agnostic system to extract specified entities from enterprise documents based at least on machine learning models and robotic process automation (RPA) processes. The ML models are trained on a large set of cross-enterprise documents and for a specific enterprise, the ML models are incrementally trained using the enterprise documents of the specific enterprise. The server system 106 is configured to implement a machine learning based pipeline architecture in the cloud infrastructure for the entire data extraction process.

The server system 106 is configured to receive an enterprise document (for example, the enterprise documents stored in the repository 104a) in semi-structured format from a user of the enterprise 102a. The user may be associated with a user device (not shown in Figures) for facilitating interaction with the server system 106 via the network 110. As such, the user may provide the enterprise document to the server system 106 as an input through the user device via the network 110. The server system 106 may include one or more machine learning (ML) models that are trained with training data for performing the operations described herein. The server system 106 is a separate part of the environment 100 and may operate apart from (but still in communication with, for example, via the network 110) any third party external servers (to access data to perform the various operations described herein). In addition, the server system 106 should be understood to be embodied in at least one computing device in communication with the network 110, which may be specifically configured, via executable instructions, to perform as described herein, and/or embodied in at least one non-transitory computer-readable media.

Further, the environment 100 includes a database 108 communicably coupled to the server system 106. The database 108 may be configured to store the trained machine learning (ML) models. In one embodiment, the database 108 may be incorporated in the server system 106 or may be an individual entity connected to the network 110 and accessible to the server system 106, or may be a database stored in a cloud storage. As such, the server system 106 with access to the database 108 is configured to automatically extract the structured data (and/or the semantic and non-sematic information) from the enterprise documents with high accuracy (close to 100 percent accuracy). More specifically, the ML algorithms are trained on a large set of training data including cross-enterprise documents, for producing outcomes (i.e. entity/information extraction) with high accuracy. The training data may include, but are not limited to, invoices, purchase orders, resumes, restaurant menus, bills, receipts, and the like. The ML algorithms may be encoded with a list of custom document features associated with the enterprise documents. The document features typically encode structural, contextual, entity-specific, and token-specific properties for each word (i.e. tokens) in the enterprise documents.

Additionally, the ML models may be trained incrementally based on the documents associated with each enterprise (i.e. enterprise-specific documents). Thereafter, the trained ML models may be deployed in a private cloud/network managed by the enterprise (e.g., the enterprise 102a) for extracting information (i.e. structured data) from the semi-structured documents. This configuration ensures privacy and security of the enterprise documents. Further, the server system 106 including the trained ML models may be configured to self-validate and check for the requirement of incremental training to produce high accuracy in information extraction from the enterprise documents.

The server system 106 may use feature engineering to identify and extract the information from the enterprise documents. In general, feature engineering is a process of extracting document features (e.g., properties, attributes, characteristics, etc.) from raw data. More specifically, the server system 106 is configured to identify one or more tokens and candidate entities in the enterprise document based at least on the trained machine learning (ML) model that uses the document features. Thereafter, the server system 106 may be configured to process the identified tokens for determining the candidate entities based at least on a combination of mathematical techniques along with rules and standards associated with the extraction of the candidate entities from the enterprise documents. Thereafter, the server system 106 may compute probability scores corresponding to the identified candidate entities. In other words, the ML models are configured to generate raw-model probability scores corresponding to the identified candidates. Thereafter, the server system 106 extracts the structured data (i.e. the candidate entities) from the enterprise document (or the semi-structured enterprise document) based on the identified candidate entities and the probability scores associated with each of the tokens. Further, the server system 106 may compute confidence scores based on the probability scores associated with the candidate entities. Furthermore, the sever system 106 may compute a document confidence score indicative of the accuracy of prediction of the candidate entities from the enterprise document.

The server system 106 may include a feedback algorithm that is configured to provide feedback based on the extracted candidate entities. This enables the ML models associated with the server system 106 to learn from the false prediction outcomes to improve the accuracy and confidence scores in a future case. Additionally, the server system 106 with access to the enterprise repositories (e.g., the enterprise repository 104*a*) is configured to at least boost or attenuate the individual confidence scores for the entities for a particular enterprise such as the enterprise 102*a*.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
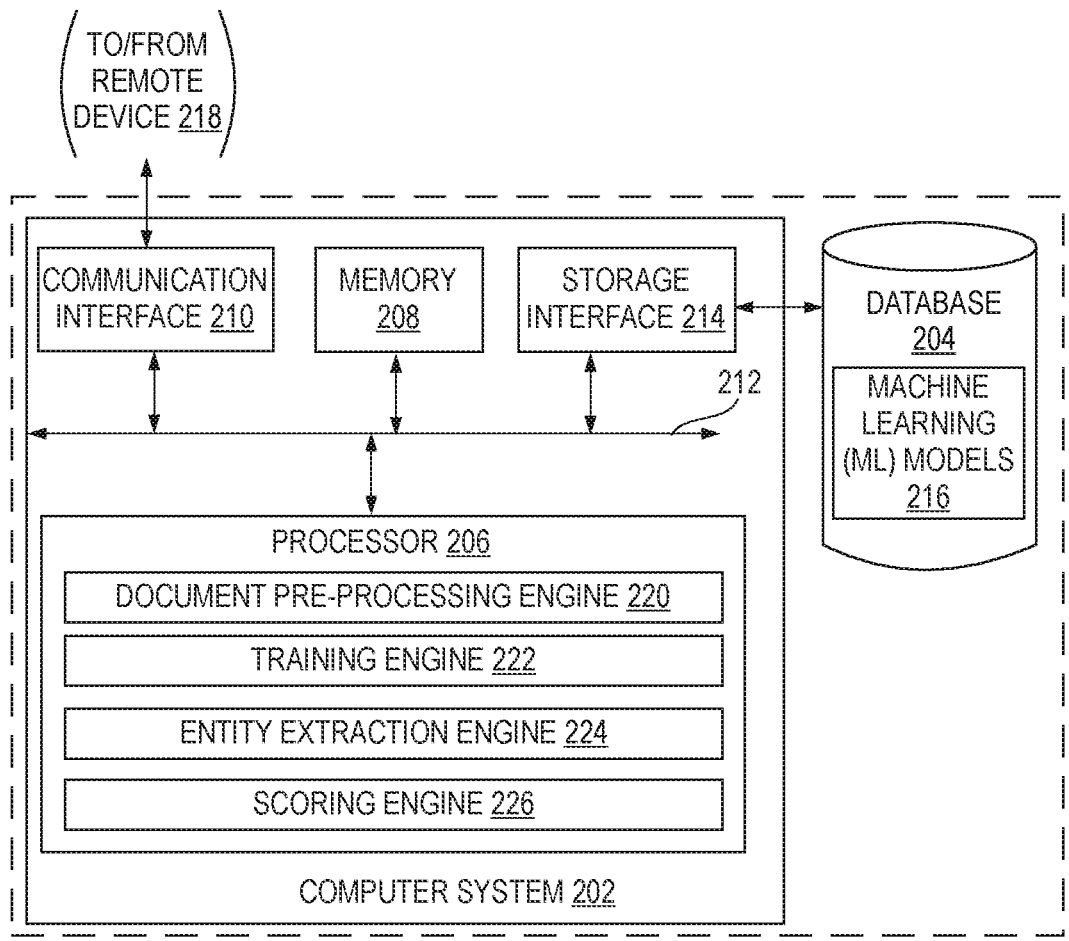
FIG. 2 is a simplified block diagram of a server system, in accordance with an embodiment of the present disclosure.

FIG. 2 is a simplified block diagram of a server system 200, in accordance with an embodiment of the present disclosure. The server system 200 is an example of the server system 106 of FIG. 1. In some embodiments, the server system 200 is embodied as a cloud-based and/or SaaS-based (software as a service) architecture. Typically, the server system 200 may use machine learning systems and/or pipeline architectures for extracting structured data from enterprise semi-structured documents.

The server system 200 includes a computer system 202 and a database 204. The computer system 202 includes at least one processor 206 for executing instructions, a memory 208, a communication interface 210, and a storage interface 214 that communicate with each other via a bus 212.

In some embodiments, the database 204 is integrated within computer system 202. For example, the computer system 202 may include one or more hard disk drives as the database 204. The storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204. In one embodiment, the database 204 is configured to store machine learning (ML) models 216 that are trained for extracting entities from the enterprise documents.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or a cloud storage working in conjunction with the server system 200, without departing from the scope of the present disclosure.

The processor 206 is operatively coupled to the communication interface 210 such that the processor 206 is capable of communicating with a remote device 218 such as, a user device operated by a user of the enterprise 102*a*, or communicated with any entity connected to the network 110 (as shown in FIG. 1).

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a document pre-processing engine 220, a model training engine 222, an entity extraction engine 224, and a scoring engine 226. It should be noted that components, described herein, can be configured in a variety of ways, including electronic circuitries, digital arithmetic and logic blocks, and memory systems in combination with software, firmware, and embedded technologies.

The document pre-processing engine 220 includes suitable logic and/or interfaces for receiving the enterprise document through the user device at the enterprise (such as, the enterprise 102*a*). Examples of the enterprise document may be, but are not limited to, invoices, audit reports, resumes, purchase orders, transaction receipts, and the like. In one example, the enterprise document is a semi-structured or an unstructured document. For example, the unstructured or semi-structured document may be in a printer format, such as Portable Document Format (PDF), or PostScript (PS) format, etc. The unstructured or semi-structured document may also be a binary representation of dark and light areas of a scanned document. Further, the unstructured or semi-structured document may not contain format markers. No information may be known about these documents, e.g. how lines of text fit together into paragraphs and sections, etc. Examples of unstructured or semi-structured documents may include user manuals for electronic devices, product specification sheets, etc.

The semi-structured documents contain either entities in the tables or the ones in non-tabular form. Based on structural category, entities are divided into two classes: tabular entities (entities that occur in table), non-tabular Entities (entities that occur elsewhere).

In some implementations, the document pre-processing engine 220 executes one or more preprocessing operations on the received input file (i.e. the enterprise document).

More specifically, the enterprise document in the format of a semi-structured document of a specific enterprise (e.g., the enterprise 102*a*) may be received as a portable document format (PDF), Tagged Image File Format (TIFF), JPEG format, and the like. The document pre-processing engine 220 may be configured to pre-process the enterprise document to improve the quality of the images of the enterprise document for enabling the entity extraction to be accurate and reliable. In one example, the document pre-processing engine 220 may include components, for example, Opencv Library to convert the images and maintain the quality of the images of the enterprise documents. The Opencv Library may facilitate the document pre-processing engine 220 to convert the images of the enterprise document into grayscale, binarization, identification of contours, and the like.

Thereafter, the document pre-processing engine 220 is configured to extract text information present in the images of the enterprise document. More specifically, the document pre-processing engine 220 may be integrated with an optical character recognition system (not shown in FIGS.) for extracting the text information from the images of the enterprise document. It should be noted that the accuracy of extraction of the text information depends on the quality of the images. In an embodiment, the server system 200 may be communicably coupled to a cloud-based OCR system via a network (for example, the network 110). In this scenario, the images of the enterprise document may be transmitted to the cloud-based OCR system for extracting the text information from the images of the enterprise document. The text information may be extracted from one or more tokens present in the enterprise document.

The entity extraction engine 224 includes suitable logic and/or interfaces for identifying the candidate entities of the enterprise document based at least the ML models 216. More specifically, the entity extraction engine 224 with access to the ML models 216 that are trained with the document features of the enterprise document is configured to identify the candidate entities (or the structured data) from the semi-structured enterprise document. The document features may be, but are not limited to, structural features, token-specific features, entity-specific features, and contextual features. For instance, extracting the candidate entities for the invoice (i.e. the enterprise document) processing may include a set of 349 document features. The set of 349 document features associated with the invoice processing are classified into structural, token-specific, entity-specific, and contextual features as explained above. As such, the ML models 216 trained with the document features from the cross-enterprise documents are configured to produce the final outcomes and/or the candidate entities with high accuracy.

More specifically, the entity extraction engine 224 is configured to identify the tokens based at least on the output of the document pre-processing engine 220 (i.e. the text information extracted from the image data of the enterprise document). The ML models 216 are configured to generate raw probability scores based on identifying the tokens corresponding to the candidate tabular and non-tabular entities from the enterprise documents which will be further explained in detail.

Thereafter, the entity extraction engine 224 is configured to identify the candidate entities in the enterprise document based at least on the raw probability scores generated by the pre-trained machine learning models 216 which uses the document features. In particular, the entity extraction engine 224 is configured to process the tokens to obtain the candidate entities. The ML models 216 may be a supervised machine learning model that may be trained with decision tree algorithms and ensemble techniques for facilitating the entity extraction engine 224 to extract the candidate entities (or the structured data) from the enterprise document. Further, the candidate entities may be classified into candidate non-tabular entities and candidate tabular entities. The entity extraction engine 224 employs the mathematical techniques and the rules on the identified tokens to obtain the candidate tabular and non-tabular entities. More specifically, the entity extraction engine 224 with access to the ML models 216 that are trained to be a generic model, extracts the candidate tabular and non-tabular entities based at least on the structural and spatial properties of the identified tokens.

During the training phase, the ML models 216 are trained with a large set of training data. More specifically, the training engine 222 includes suitable logic and/or interfaces for training the ML models 216 with the large set of training data using a decision tree with ensemble technique as explained above, for obtaining a generic ML model for extracting the candidate entity from the enterprise documents. The training data may include various semi-structured cross-enterprise documents such as, but not limited to, invoices, purchase orders, resumes, restaurant menus, transaction receipts and bills, and the like. Typically, the aforementioned documents may be of various formats based on the structural features. Prior to training the ML models 216, the training data may be pre-processed by the document pre-processing engine 220. More specifically, the document pre-processing engine 220 extracts the text information (or the tokens) from the training data. Thereafter, the document pre-processing engine 220 may generate a document format corresponding to each of the enterprise documents included in the training data based at least on properties such as, but not limited to, layout property, word-shape property and label property of each of the individual tokens. The document format corresponding to each of the enterprise documents may be created based at least on the structural and spatial properties of the candidate entities in the training data. The enterprise documents in the training data are clustered into corresponding document formats which will be explained further in detail.

Further, the trained ML models 216 may be fine-tuned for improving the extraction of the candidate entities from the enterprise document by using a validation dataset. Furthermore, a candidate entity extraction accuracy may be evaluated by using a test dataset on which the trained ML models 216 are applied to extract the candidate entities from the test dataset. Based on successful validation and testing, the final ML models 216 are deployed for extracting the candidate entities from the enterprise documents in real-time.

The server system 200 is capable of identifying unknown formats to retrain the generic ML models (i.e. the ML models 216) with the unknown formats. In one example scenario, the training engine 222 may perform incremental training to the ML models 216 based on the specific enterprise for extracting the candidate entities from the enterprise-specific document. The incremental training of the ML models 216 based on the specific enterprise improves the accuracy of the entity extraction engine 224. Additionally, the entity extraction engine 224 may be configured to flag the output (or the candidate entities) based on receipt of the feedback from the user. The flagged candidate entities are used to correct the post-processing rules, retrain, and update the ML models 216, thereby leading to improvement in the accuracy in entity extraction for future instances.

The scoring engine 226 includes suitable logic and/or interfaces that use probability scores of each token, to generate a confidence score for the output (i.e. the candidate entities) of the entity extraction engine 224, and a document confidence score. More specifically, the scoring engine 226 with access to the prediction output of the trained ML models 216 are configured to use the probability scores of the identified tokens in the individual candidate entities for the documents associated with a particular enterprise. Further, the scoring engine 226 is configured to convert the raw probability scores associated with the tokens to the confidence score upon extraction of the candidate entities from the document associated with a particular enterprise (e.g., the enterprise 102a). The scoring engine 226 computes the document confidence score based on computing a weighted average of the confidence score associated with each of the candidate entities. The document confidence score indicates the accuracy and/or overall confidence of prediction of the candidate entities from the enterprise document associated with the particular enterprise.

The ML models 216 output is coupled with a scoring algorithm for generating the confidence score for the candidate entities and the document confidence score. Further, the scoring algorithm may include a cumulative threshold for an enterprise document and individual thresholds for various candidate entities in the enterprise document that is defined by the enterprise. The thresholds defined by the enterprise decide which enterprise document can be proceeded for straight through processing (STP). Additionally, the scoring engine 226 may access a repository specific to an enterprise (e.g., the repository 104a of the enterprise 102a) for attenuating and/or boosting the confidence score of individual candidate entities.

FIGS. 3A-3D, collectively, represent a training pipeline architecture for training the ML models 216, in accordance with an embodiment of the present disclosure.

Figure 3A:
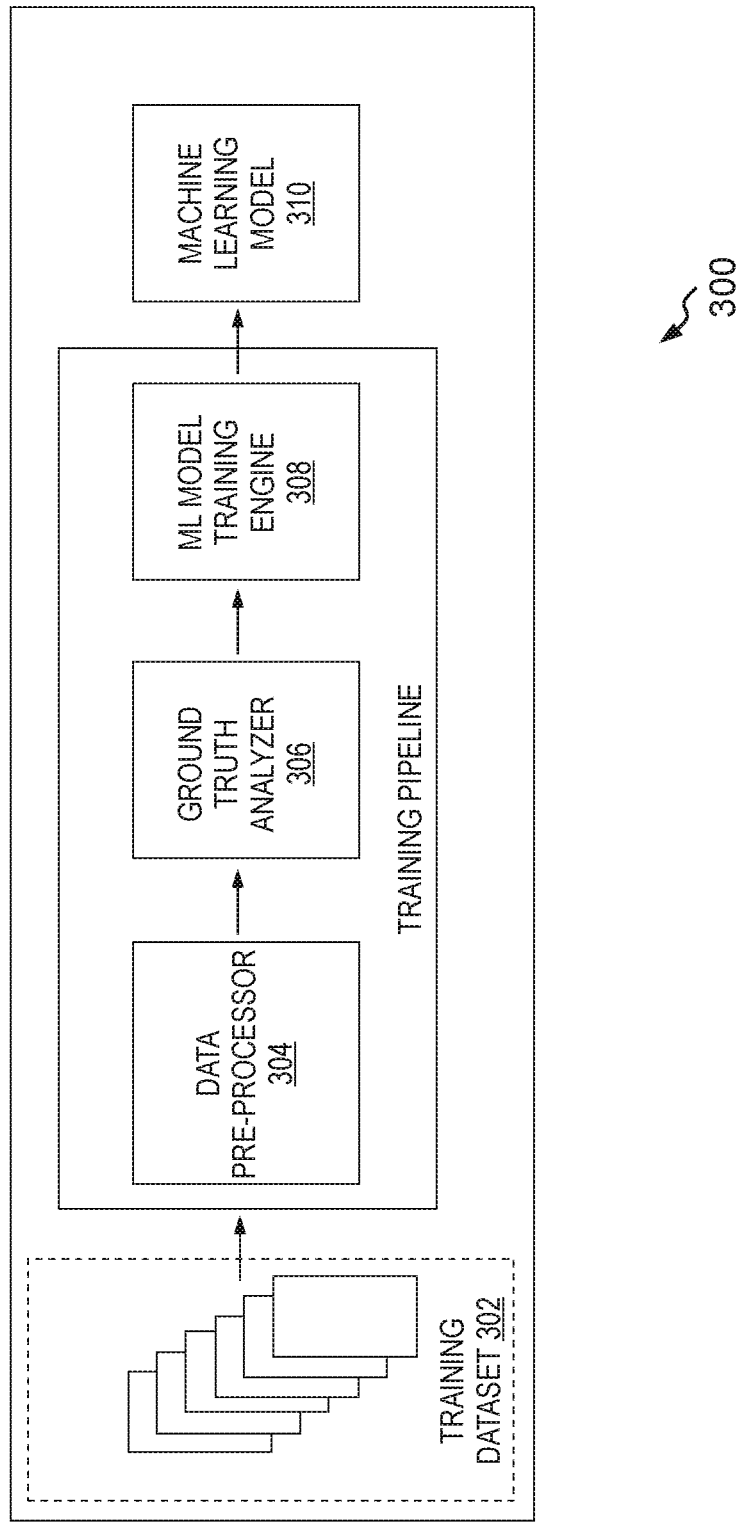
FIGS. 3A-3D, collectively, represent a training pipeline architecture for training machine learning (ML) models associated with the server system of FIG. 2, in accordance with an embodiment of the present disclosure.

Referring to FIG. 3A, illustrates a schematic representation of a training pipeline 300 for creating a generic ML model, in accordance with an embodiment of the present disclosure. The training pipeline 300 includes various components such as a data pre-processor 304, a ground truth analyzer 306, and a training engine 308. As explained above, the ML models are trained with a large set of training dataset 302. More specifically, the ML models may be encoded and/or trained with the document features associated with the cross-enterprise documents (i.e. the training dataset 302) which is further explained in detail. The document features typically encode structural, contextual, entity-specific, and token-specific properties for each word (i.e. tokens) in the enterprise documents.

Prior to training the ML models, the training dataset 302 is provided to the data pre-processor 304 for performing one or more pre-processing operations described herein. The training dataset 302 may include, but is not limited to, a plurality of enterprise documents from different enterprises. The plurality of enterprise documents can be classified and clustered based on structural and spatial features which will be explained with reference to FIG. 3B.

Figure 3B:
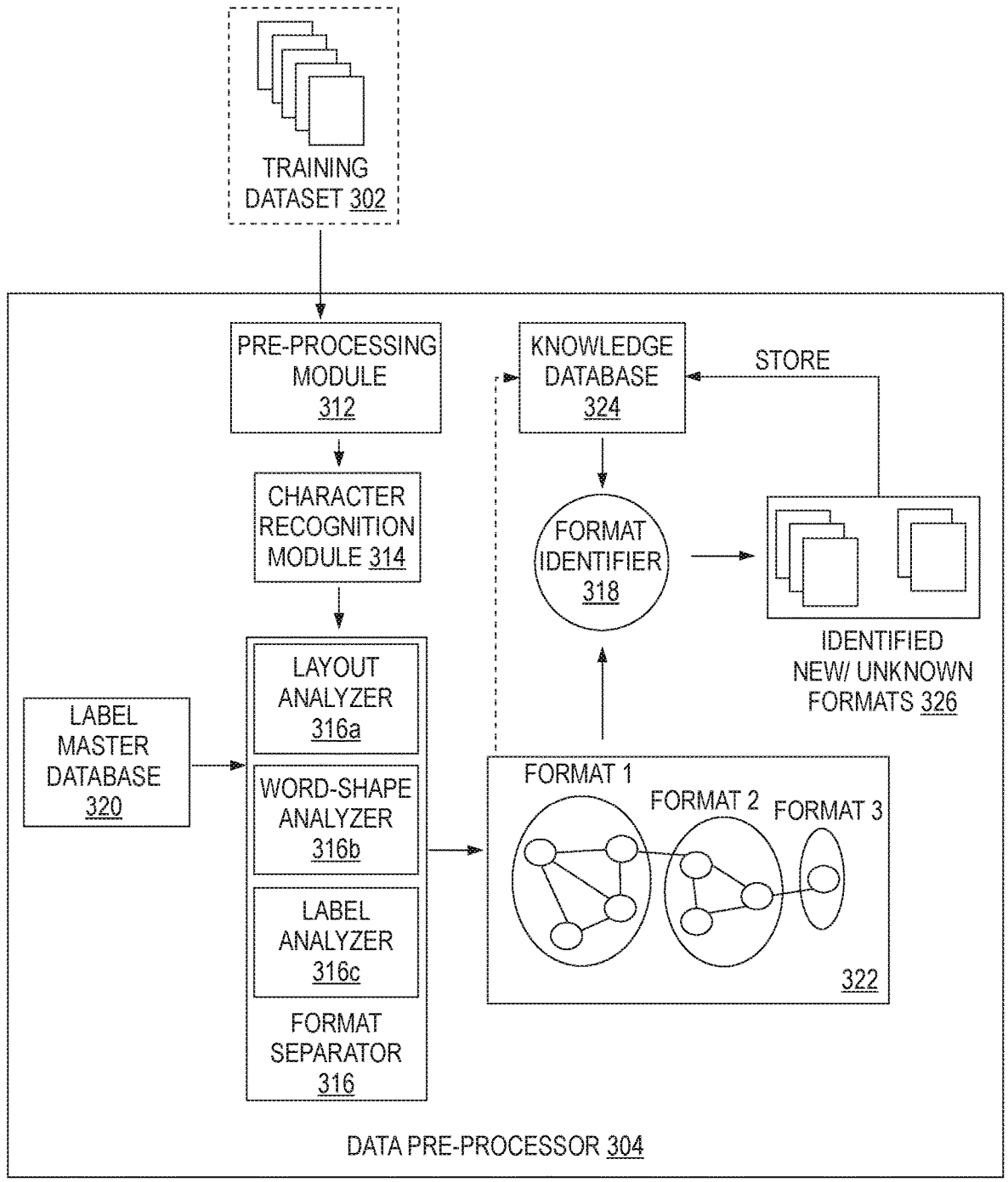
Figure 3C:
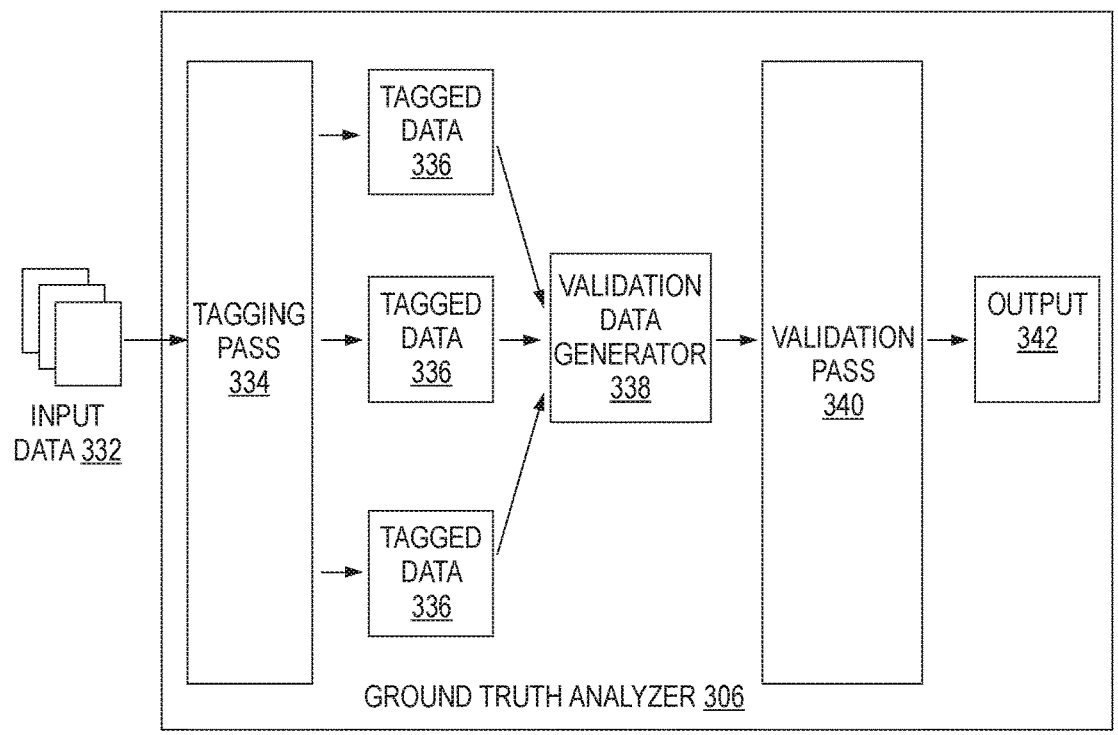

The output of the data pre-processor 304 is provided to the ground truth analyzer (see, FIG. 3C). The ground truth analyzer 306 verifies the correctness of data tagging in the training dataset 302 and flags manual errors in the data tagging. In other words, the correctness and completeness of the tagged data in the training dataset 302 are validated by the ground truth analyzer 306 for ensuring the accuracy of the supervised ML algorithms. Upon pre-processing and validating the training dataset, the training engine 308 performs training of the ML models (i.e. the supervised ML models) using decision tree algorithms with ensemble techniques. The training engine 308 is similar to the training engine 222 as explained with reference to FIG. 2. Thus, the training pipeline 300 outputs ML models 310 that are trained with the document features extracted from the training dataset 302. The ML models 310 are similar to the ML models 216. The ML models 310 that are trained with the training dataset 302 are a generic system that can be implemented on the enterprise documents of various enterprises to extract the candidate entities.

Referring to FIG. 3B, a schematic representation of the data pre-processor 304 is illustrated. Typically, the enterprise documents in the training dataset 302 contain various kinds of table and non-tabular forms (i.e. the candidate entities) that are arranged at multiple places in the documents. These candidate entities are categorized based at least on their structural and spatial properties in the documents. More specifically, the candidate entities are classified as the candidate tabular entities (usually repetitive in nature) and the candidate non-tabular entities based at least on the structural property. Further, the candidate entities are classified as, particularly, the candidate non-tabular entities into a single word entity, a multi-word entity, and a multi-line entity based at least on the spatial properties.

The data pre-processor 304 includes a pre-processing module 312, a character recognition module 314, a format separator 316, and a format identifier 318. The training dataset 302 is provided to the pre-processing module 312. As explained above, each vendor associated with the particular enterprise may send the documents in electronic format. As such, the pre-processing module 312 includes suitable logic and/or interfaces for converting the documents in the training dataset 302 into image format. Typically, the pre-processing module 312 may include OpenCV Library to convert the images of the documents into grayscale, binarization, and the like. Thereafter, the documents in the image format are transmitted to the character recognition module 314. The character recognition module 314 may be configured to identify the tokens in the documents based at least on the optical character recognition (OCR) techniques. In an embodiment, the character recognition module 314 may be integrated within the data pre-processor 304 (as shown in FIG. 3B). In another embodiment, the data pre-processor 302 may transmit the training dataset 302 to an external cloud-based OCR system for extracting the tokens in the documents of the training dataset 302. In this scenario, the documents in the training dataset 302 may be transmitted to the cloud-based OCR system in binary format, thus ensuring the security and privacy of the documents.

Thereafter, the tokens associated with each document in the training dataset 302 are transmitted to the format separator 316. The format separator 316 is configured to cluster and/or encode the documents into corresponding document formats based at least on the document properties (such as the layout property, the word-shape property, and the label property) associated with the tokens. The format separator 316 includes a plurality of modules for deriving the aforementioned properties associated with individual tokens. The plurality of modules associated with the format separator 316 is a layout analyzer 316a, a word-shape analyzer 316b, and a label analyzer 316c.

The layout analyzer 316a analyzes the spatial location (i.e. x and y-coordinates) of the identified tokens in the document. In other words, the layout analyzer 316a extracts the layout property of the individual tokens by finding bounding boxes for each of the tokens. Further, the word-shape analyzer 316b takes the actual text information from each of the tokens and generates its word-shape property. More specifically, the word-shape property encodes the exact nature of each character in the tokens by storing a continuous stream of "X" and "D", where "X" represents an alphabet or a special character and "D" represents a digit. The label analyzer 316c may be coupled to a label master database 320 (as shown in FIG. 3B). The label property is a specific tag that is associated with each of the candidate entities present in the document (for example, the label and/or the tag in the invoice documents may be the "invoice number"). The label analyzer 316c takes the actual text information from each of the tokens and performs a fuzzy search into the label master database 320 to determine whether the token is a label for any of the candidate entities or not. The label analyzer 316c determines whether the token is the label of the candidate entities based at least on a label match score. The label match score indicates the similarity between the labels assigned to the tokens that are stored in the label master database 320 and the tokens extracted from the document which may be the probable labels for the entity. Thus, the label property for the token is populated based at least on the label match score. Thus, it is evident that the format separator 316 including the layout analyzer 316a, the word-shape analyzer 316b, and the label analyzer 316c are configured to extract the layout property, the word-shape property, and the label property of the individual tokens, respectively.

Further, the documents are clustered into various document formats based at least on a document similarity score associated with each pair of the enterprise documents in the training dataset 302. The document similarity score is computed based at least on an overall token similarity score and an overall label similarity score which will be explained with reference to FIGS. 4A and 4B. The format separator 316 generates a document cluster graph 322 based at least on the document similarity score associated with each pair of the enterprise documents. The document cluster graph 322 includes nodes that represent the enterprise documents and edges to represent the similarity between the enterprise documents. In other words, the format separator 316 clusters the documents into corresponding document formats (exemplarily depicted to be format 1, format 2, and format 3) and generates the document cluster graph 322. The document cluster graph 322 including the documents of various document formats may be stored in a knowledge database 324.

Thereafter, the document cluster graph 322 is provided as input to the format identifier 318. The format identifier 318 with access to the knowledge database 324 is configured to assign a document label indicative of the document format for each of the enterprise documents based at least on the document similarity score associated with the enterprise documents. In one case, the document label is marked as unknown format (see, 326), if the document similarity score associated with the enterprise document is determined to be less than a threshold document similarity score. Further, the documents marked as unknown format (see, 326) may be stored in the knowledge database 324 for training the ML models 310. In another case, the document label is marked as known format, if the document similarity score associated with the enterprise document is determined to be greater than the threshold document similarity score. For instance, a document d may be selected from the new enterprise documents that are clustered into corresponding document formats. The format identifier 318 compares the document d with the enterprise documents (one for each known format) stored in the knowledge database 324 for computing the document similarity score between them. In other words, the format identifier 318 calculates the document similarity score of the document d with all the documents stored in the knowledge database 324. Thereafter, the format identifier 318 marks the document format associated with the document d as an unknown format, if the document similarity score for the document d is determined to be less than a specified threshold document similarity score.

Referring to FIG. 3C, a schematic representation of the ground truth analyzer 306 is illustrated. The ground truth analyzer 306 is configured to verify the correctness of the tagged data in the documents that are of unknown format. Verifying the correctness of the data improves the accuracy of the ML model 310 to predict the outcomes. Usually, the data tagging process is manual, making it error-prone.

The ground truth analyzer 306 receives an input data 332. The input data 332 includes the enterprise documents that are marked as an unknown format. The input dataset 332 is provided to a tagging pass 334 associated with the ground truth analyzer 306. The tagging pass 334 may include a plurality of data annotators (not shown in FIGS.) for data tagging. Prior to providing the input data 332 that are marked as the unknown format to the tagging pass 334, the input data 332 may be pre-processed to extract the text information from the enterprise documents as explained with reference to FIG. 3B. The tagging pass 334 is configured to generate a plurality of tagged data 336 as output for the documents of the same format, thereby ensuring the probability of an error being made by all the data annotators is low. Thereafter, the plurality of tagged data 336 is subjected to a validation process to validate the correctness of the data tagging. More specifically, a validation data generator 338 is configured to compute a tagged data similarity score for each of the candidate entities which will be explained with reference to FIG. 4C. Thereafter, the tagged data 336 along with their intra-format tagged data similarity score are routed to a validation pass 340. The validation pass 340 flags the incorrect tagging based at least on the intra-format tagged data similarity score and produces an output 342 (i.e. the correct tagged data) by fixing the incorrect tagging among the tagged data 336. This method of automatic flagging of the tagged data 336 increases the accuracy of the ML models 310.

Thereafter, the training engine 308 receives the tagged data which is used to train ML Models 310 which henceforth give the prediction of the candidate entities with better recall and precision. The training engine 308 may include a feature extraction module (not shown in FIGS.) to combine the tagged data (i.e. the output 342 from the ground truth analyzer 306) with the extracted document features. In one example, the training dataset 302 may include invoices, purchase orders, restaurant menus, legal documents, etc. A total of 349 document features are extracted which are further classified based on structural, token-specific, entity-specific, and contextual features and are utilized for predicting the candidate entities from the documents (for example, invoices). In particular, the structural document features mainly include spatial positions of the tokens, structural encoding of the tokens, page numbers, presence of horizontal/vertical line surrounding the tokens, and the like. Further, the token-specific document features may include the nature and properties of the individual tokens. The entity-specific document features include the custom rules for each candidate entity and the contextual document features may define the tokens based on the properties associated with the surrounding tokens.

Upon combining the tagged data with the document features, the training engine 308 trains and outputs the ML models 310. More specifically, the training engine 308 trains the ML models 310 with the training dataset (i.e. universal dataset) based at least on a decision tree classifier algorithm with ensemble techniques which is explained above. The trained ML models 310 are generic in nature and can be deployed to extract the candidate entities from a variety of enterprise semi-structured documents.

Figure 3D:
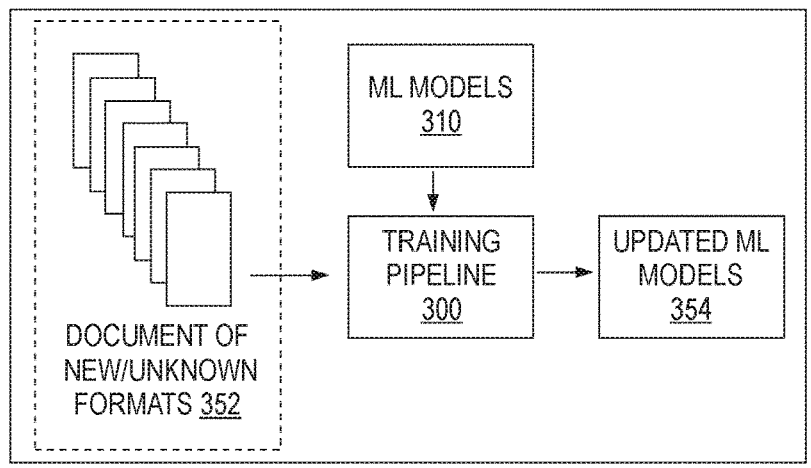

Referring to FIG. 3D, a schematic representation of an incremental training pipeline 350 is illustrated. The ML models 310 from the training pipeline 300 can be further tuned for high recall and precision. Typically, the ML algorithms include hyper parameters. The hyper parameters correspond to a set of tunable properties of the ML algorithm which controls the learning process. The validation dataset is used for tuning the hyper parameters of the ML algorithm. More specifically, to obtain a better entity prediction accuracy, the optimal values for these hyper parameters need to be identified and the ML algorithm is trained using the corresponding optimal values. For instance, the ML algorithm is selected to be the decision tree classifier algorithm which includes a plurality of hyper parameters (for example, six hyper parameters). The hyper parameters and their associated properties of the decision tree classifier algorithm are listed in the following table 1:

TABLE 1

| SL. No. | Hyper Parameter | Description |
| --- | --- | --- |
| 1. | max_depth | Limits the depth of the tree |
| 2. | num_leaves | Controls the complexity of tree models |
| 3. | min_data_in_leaf | Prevents over-fitting of leaf-wise trees |
| 4. | feature_fraction | Subsample of features is used to fit the model |
| 5. | bagging_fraction | Controls bagging fraction of the tree |
| 6. | lambda_l1 | Used for Regularization |

Upon tuning the hyper parameters of the ML algorithm, the accuracy of the ML models 310 is evaluated using the test dataset. Further, the ML models 310 are tuned for high recall for the documents that are identified as known formats based on adjusting the hyper parameters of the ML algorithm. Tuning the ML models 310 for high recall ensures the drop in recall of the candidate entities in the enterprise documents that are marked as the unknown format. This enables the training pipeline 300 to identify the enterprise documents that are likely to be the unknown format, which is then used to re-train the generic ML models (i.e. the ML models 310) with the enterprise documents that are of unknown format.

As shown in FIG. 3D, the enterprise documents that are of unknown format (see, 352) are provided to the training pipeline 300 for training the pre-trained ML models (i.e. the ML models 310). In this scenario, the enterprise documents that are of new/unknown format may be provided to the training pipeline 300 for training the pre-trained ML models 310 with the documents of the new format (as shown in FIG. 3D). In one embodiment, the enterprise may receive the documents from their partners, vendors, and the customers associated with a different format. In such scenarios, the enterprise may provide the enterprise documents (for example, five enterprise documents of the new document format) of their partners or vendors which are unregistered to train the ML models 310 that are already trained with the training dataset 302. The incremental training pipeline 350 outputs updated ML models 354 by training the ML models 310 with the enterprise documents of the unknown/new format. The updated ML models 354 can be used to convert the enterprise documents of the unknown format into a known format, hence improving their recall and precision. In other words, the updated ML models 354 can be deployed at the enterprise for extracting the candidate entities from the enterprise documents of the new/unknown format with high precision and recall.

Figure 4A:
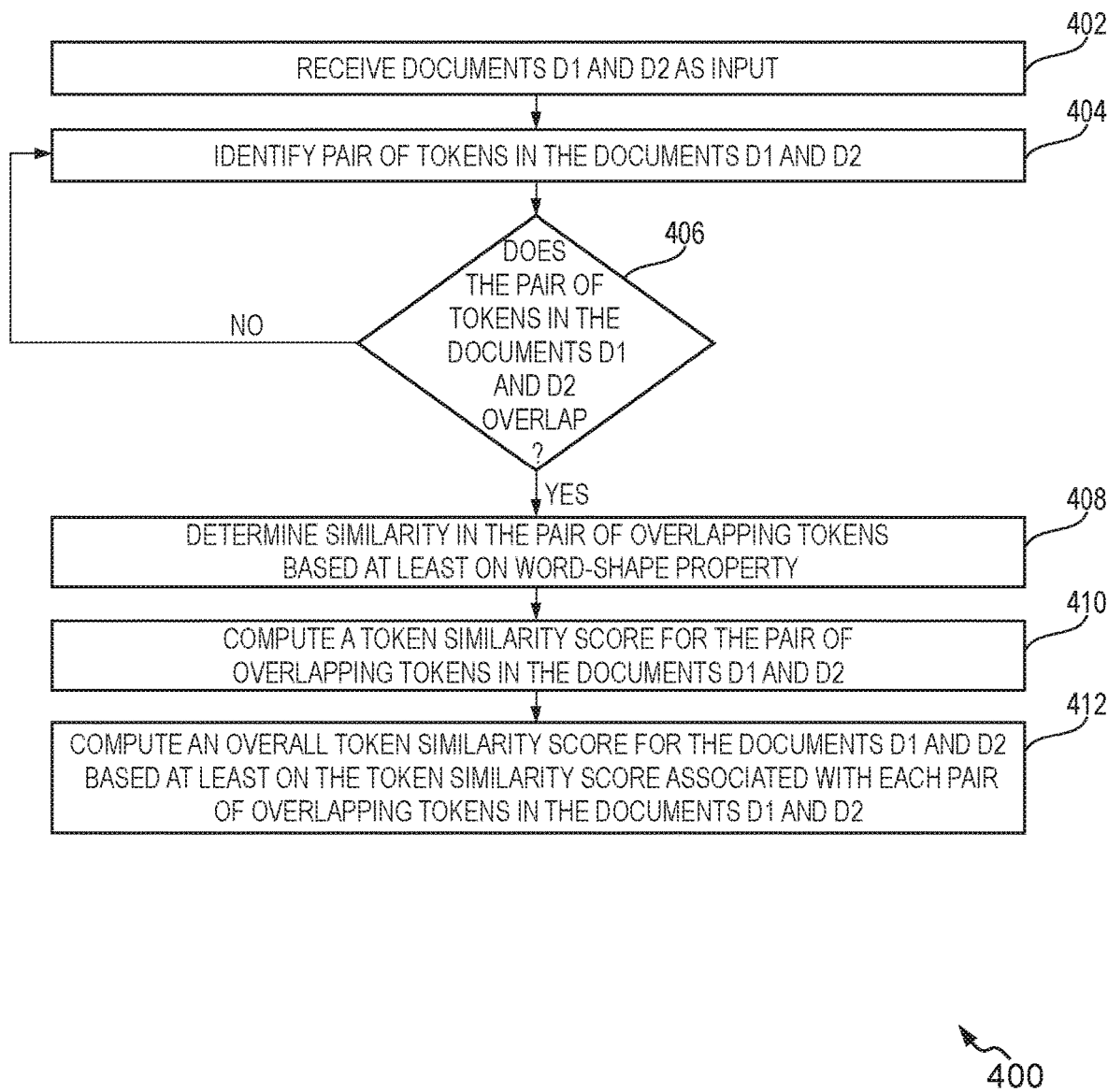
FIG. 4A represents a flow chart for computing an overall token similarity score for an enterprise document, in accordance with an embodiment of the present disclosure.

FIG. 4A represents a flow chart 400 for computing an overall token similarity score for the enterprise documents, in accordance with an embodiment of the present disclosure. For description purposes, computation of the overall token similarity score is explained with reference to a document D1 and a document D2. The documents D1 and D2 may be the enterprise documents associated with an enterprise, for example, the enterprise 102a. The sequence of operations of the flow chart 400 may not be necessarily executed in the same order as they are presented. Further, one or more operations may be grouped and performed in the form of a single step, or one operation may have several sub-steps that may be performed in parallel or a sequential manner.

At 402, the documents D1 and D2 are received as inputs at the format separator 316. More specifically, the documents D1 and D2 are pre-processed as explained with reference to FIG. 3B and are provided as input to the format separator 316 associated with the server system 200 for computing the token similarity score.

At 404, the format separator 316 identifies the pair of tokens in the documents D1 and D2.

At 406, the format separator 316 checks if the pair of tokens in the documents D1 and D2 overlap. In one scenario, if the tokens in the documents D1 and D2 are determined to be overlapping, step 408 is performed.

At 408, the format separator 316 determines similarity in the pair of overlapping tokens based at least on the word-shape property associated with the pair of overlapping tokens in the documents D1 and D2.

At 410, a token similarity score for the pair of overlapping tokens in the documents D1 and D2 is computed. More specifically, the token similarity score is computed by the format separator 316 for the pair of overlapping tokens in the documents D1 and D2. In case, the tokens in the documents D1 and D2 are determined to be not overlapping, the step 404 is repeated to further identify the pair of overlapping tokens in the documents D1 and D2. Further, the steps 404 to 410 are repeated by the format separator 316 for computing the token similarity score for each pair of overlapping tokens in the documents D1 and D2.

At 412, an overall token similarity score for the documents D1 and D2 is computed based at least on the token similarity score associated with each pair of overlapping tokens in the documents D1 and D2. More specifically, the format separator 316 computes the overall token similarity score by taking the average of the individual token similarity scores associated with each pair of overlapping tokens of the documents D1 and D2.

Figure 4B:
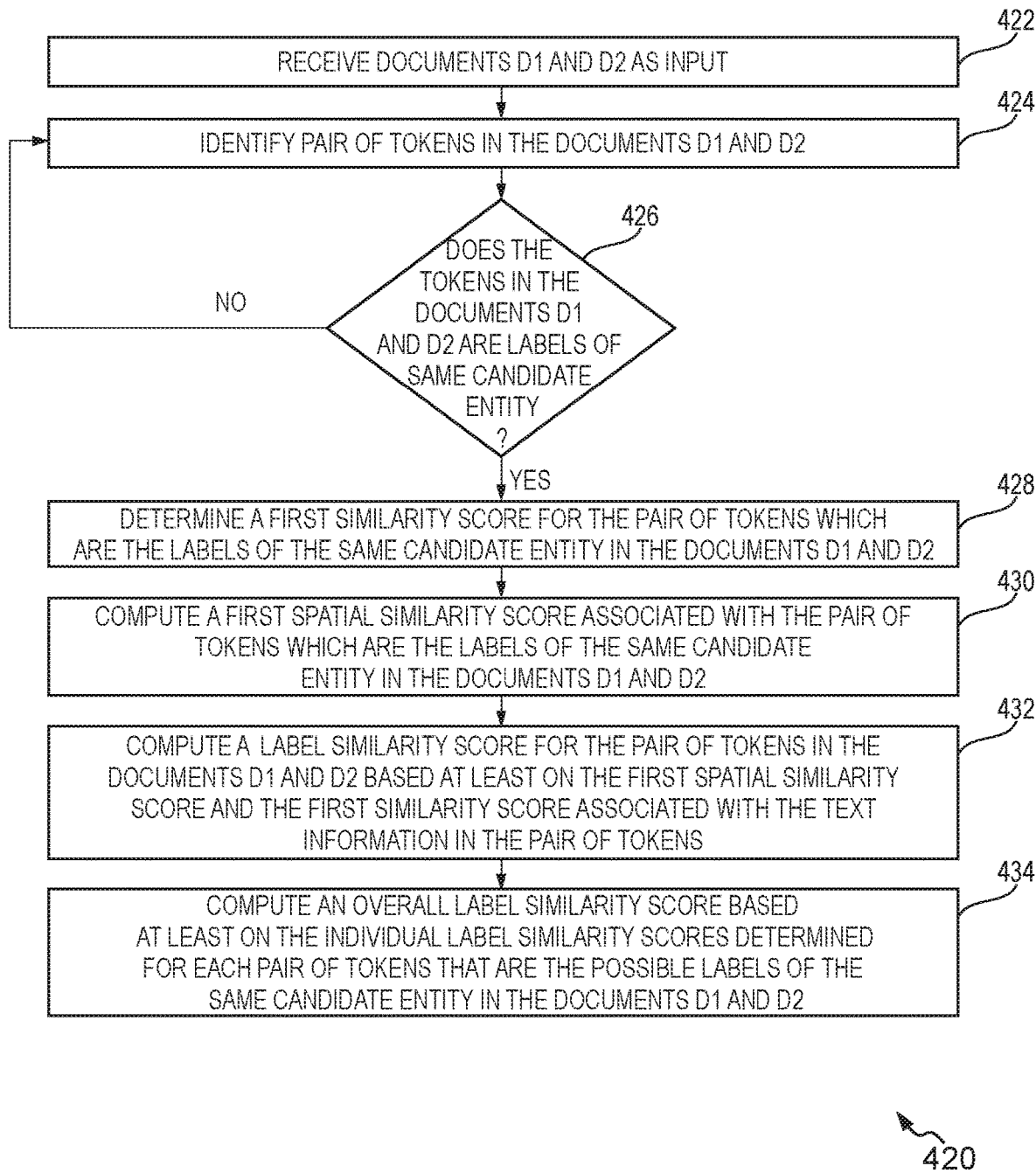
FIG. 4B represents a flow chart for computing an overall label similarity score for the enterprise document, in accordance with an embodiment of the present disclosure.

FIG. 4B represents a flow chart 420 for computing an overall label similarity score for the enterprise documents, in accordance with an embodiment of the present disclosure. For description purposes, computation of the overall label similarity score is explained with reference to the document D1 and the document D2. The documents D1 and D2 may be the enterprise documents associated with an enterprise, for example, the enterprise 102a. The overall label similarity score quantifies the similarity of the entity labels in the documents D1 and D2. The sequence of operations of the flow chart 420 may not be necessarily executed in the same order as they are presented. Further, one or more operations may be grouped and performed in the form of a single step, or one operation may have several sub-steps that may be performed in parallel or in a sequential manner.

At 422, the documents D1 and D2 are received as input at the format separator 316. As explained above, the documents D1 and D2 are pre-processed and are transmitted to the format separator 316 associated with the server system 200 for computing the overall label similarity score. At 424, the pair of tokens in the documents D1 and D2 are identified by the format separator 316.

At 426, the format separator 316 checks if the tokens in the documents D1 and D2 are the labels of the same candidate entity or not. More specifically, the format separator 316 may access a label master database (i.e. the label master database 320) to determine whether the identified pair of tokens are the labels for the same candidate entities.

In one scenario, if the tokens in the documents D1 and D2 are determined to be the labels of the same candidate entity, step 428 is performed.

At 428, a first similarity score for the pair of tokens which are the labels of the same candidate entity in the documents D1 and D2 is determined by the format separator 316. The first similarity score indicates the similarity in the text information of the pair of tokens which are the labels of the same candidate entity.

At 430, a first spatial similarity score associated with the pair of tokens which are the labels of the same candidate entity in the documents D1 and D2 is computed by the format separator 316. The first spatial similarity score can be computed using the following equation (Eq. 1):

$$\text{Spatial similarity score} = [1 - (\sqrt{((Xt_1 - Xt_2)^2 + (Yt_1 - Yt_2)^2)}/\sqrt{2})] \quad (Eq.\ 1)$$

Where, $Xt_1$ and $Xt_2$ represent the x-coordinates of the pair of tokens in the documents D1 and D2, and $Yt_1$ and $Yt_2$ represent the y-coordinates of the pair of tokens in the documents D1 and D2.

At 432, the label similarity score for the pair of tokens in the documents D1 and D2 is computed based at least on the first spatial similarity score and the first similarity score associated with the text information in the pair of tokens. More specifically, the format separator 316 computes a weighted average of the first similarity score associated with the text information and the first spatial similarity score of the pair of tokens which are identified as the labels of the same candidate entity. The weighted average is the label similarity score of the pair of tokens which are the labels of the candidate entity in the documents D1 and D2. In case, the tokens in the documents D1 and D2 are not the labels of the same candidate entity, the step 424 is repeated to further identify the tokens which may be possible labels for the same candidate entity in the documents D1 and D2. Further, the server system 200 repeats the steps 424 to 432 for computing the label similarity score for the pair of tokens which are possible labels of the same candidate entity in the documents D1 and D2.

At 434, an overall label similarity score is computed based at least on the individual label similarity scores determined for each pair of tokens that are the possible labels of the same candidate entity in the documents D1 and D2. More specifically, the format separator 316 computes the overall label similarity score by computing the average of the individual label similarity score associated with the tokens that are the labels of the same candidate entity in the documents D1 and D2.

Thereafter, the document similarity score is computed by the format separator 316 for the documents D1 and D2 based at least on the overall token similarity and the overall label similarity scores associated with the documents D1 and D2. In other words, the similarity between the documents D1 and D2 (i.e. the document similarity score) is determined by taking the weighted average of the overall token similarity score and the overall label similarity score associated with the documents D1 and D2. The weights are computed based at least on the statistical analysis. Additionally, the format separator 316 is configured to cluster the documents into corresponding document format based at least on the document similarity score associated with each of the document pairs which is already explained with reference to FIG. 3B. Further, the format identifier 318 is configured to mark the document format of the document (i.e. identify the unknown format) based at least on the document similarity score which is already explained with reference to FIG. 3B.

Figure 4C:
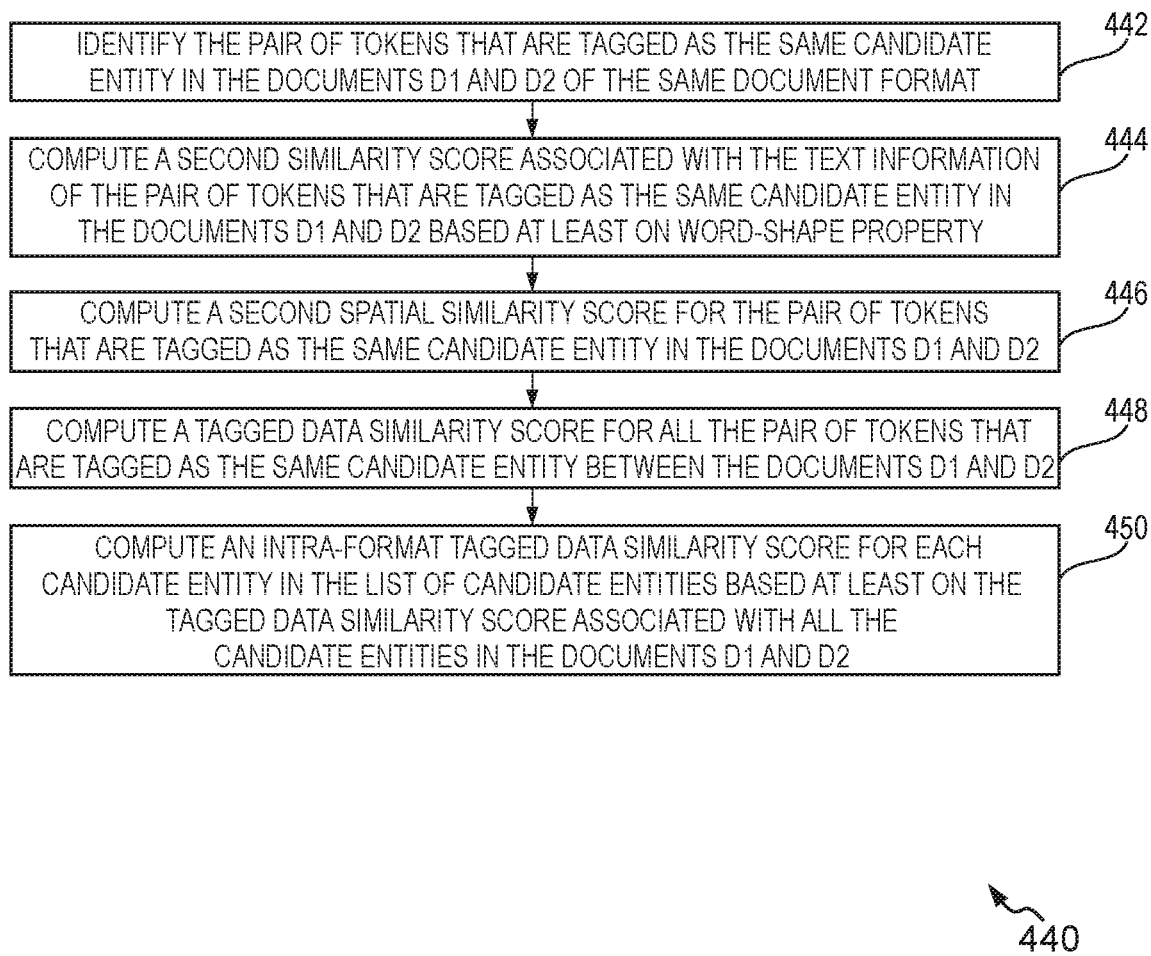
FIG. 4C represents a flow chart for computing an intra-format tagged data similarity score for each candidate entity in the enterprise document, in accordance with an embodiment of the present disclosure.

FIG. 4C represents a flow chart 440 for computing an intra-format tagged data similarity score for each candidate entity in the enterprise documents of the same format, in accordance with an embodiment of the present disclosure. For description purposes, computation of the intra-format tagged data similarity score is explained with reference to the document D1 and the document D2. The documents D1 and D2 may be the enterprise documents associated with an enterprise, for example, the enterprise 102a. The documents D1 and D2 may be of the same document format (exemplarily represented as the document format 'F') and may include a list of candidate entities (exemplarily represented as the candidate entities 'E'). The sequence of operations of the flow chart 440 may not be necessarily executed in the same order as they are presented. Further, one or more operations may be grouped and performed in the form of a single step, or one operation may have several sub-steps that may be performed in parallel or a sequential manner.

At 442, the pair of tokens that are tagged as the same candidate entity in the documents D1 and D2 of the same document format 'F' are identified.

At 444, a second similarity score associated with the text information of the pair of tokens that are tagged as the same candidate entity in the documents D1 and D2 is computed. More specifically, the ground truth analyzer 306 computes the second similarity score associated with the text information of the pair of tokens tagged as the same candidate entity in the documents D1 and D2 based at least on the word-shape property.

At 446, a second spatial similarity score for the pair of tokens that are tagged as the same candidate entity in the documents D1 and D2 is computed by the ground truth analyzer 306. As explained above, the second spatial similarity score can be computed by using the equation (Eq. 1). Similarly, the steps 442 to 446 are repeated to determine the second similarity score associated with the text information and the second spatial similarity score for all the pair of tokens that are tagged as the same candidate entity in the documents D1 and D2 of the same document format 'F'.

At 448, the tagged data similarity score for all the pair of tokens that are tagged as the same candidate entity between the documents D1 and D2 is computed. More specifically, the ground truth analyzer 306 computes the tagged data similarity score based on the average of the second similarity score and the second spatial similarity score associated with all the pair of tokens that are tagged as the same candidate entity in the documents D1 and D2 of the same document format 'F'.

At 450, the intra-format tagged data similarity score for each candidate entity in the list of candidate entities 'E' is computed based at least on the tagged data similarity score associated with all the candidate entities in the documents D1 and D2. In other words, the ground truth analyzer 306 compares the tagged values of all the candidate entities 'E' in the documents D1 and D2 in the same format 'F' and computes a match score (i.e. the intra-format tagged data similarity score). The intra-format tagged data similarity score indicates that the same tag will be located at approximately the same spatial location and includes almost similar word shapes across the documents of the same document format 'F'.

Figure 5:
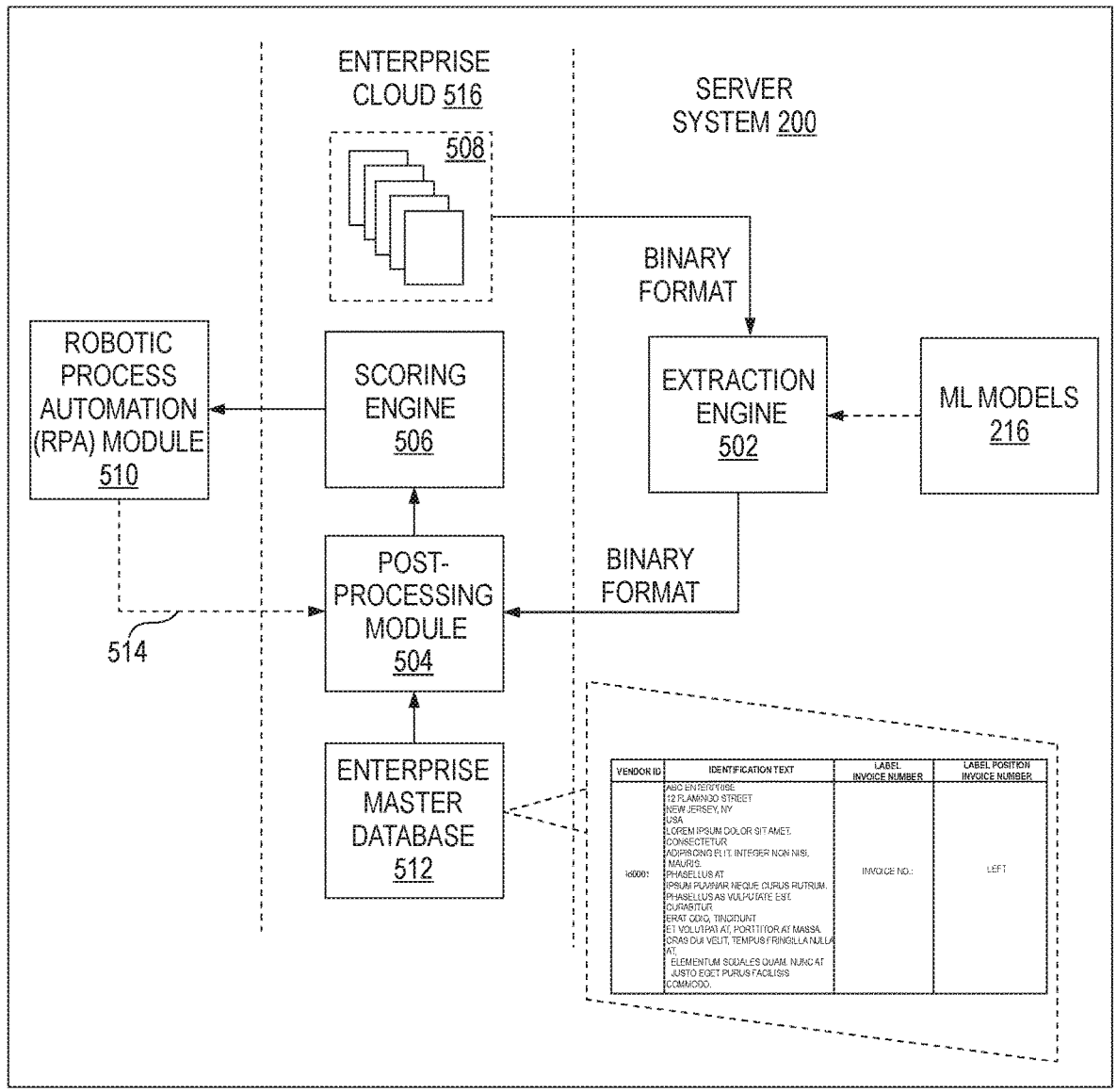
FIG. 5 illustrates a schematic representation of an entity extraction pipeline for extracting the candidate entities from the enterprise document, in accordance with an embodiment of the present disclosure.

FIG. 5 illustrates a schematic representation of an entity extraction pipeline 500 for extracting the candidate entities from the enterprise documents, in accordance with an embodiment of the present disclosure. Typically, the output from the ML models 216 or the ML models 310 includes the tokens (i.e. the text information) and their probability score.

Most often, an individual candidate entity may include multiple tokens. For example, invoice and number are the identified tokens and they have to be combined to form a single candidate entity. The entity extraction pipeline 500 is configured to apply mathematical techniques and rules to generate the final prediction output for each of the candidate entities and quantify the extracted candidate entities with confidence scores.

The entity extraction pipeline 500 includes an extraction engine 502, a post-processing module 504, and a scoring engine 506. As shown, enterprise documents (see, 508) associated with a particular enterprise (e.g., the enterprise 102a) are transmitted to the extraction engine 502 associated with a server system (such as the server system 200). The server system 200 hosting the extraction engine 502 may include necessary application programming interfaces (APIs) associated with Hypertext Transfer Protocol (HTTP) for enabling transmission of the enterprise documents 508 between the server system 200 and the enterprise 102a in a secured manner. It should be noted that the enterprise documents 508 are converted into a binary stream, prior to transmitting to the extraction engine 502. Thereafter, the enterprise documents 508 in the binary format are transmitted to the extraction engine 502 through secured APIs.

The extraction engine 502 with access to the ML models 216 is configured to pre-process the enterprise documents 508 and extract the candidate entities in the enterprise documents 508. More specifically, the extraction engine 502 is configured to at least convert the electronic format of the enterprise documents 508 into image format, improve the quality of the image format by using OpenCV library. The extraction engine 502 with access to the trained ML models (i.e. the ML models 216) identifies the tokens in the enterprise documents 508. The tokens may include the information corresponding to the candidate tabular entities and the candidate non-tabular entities. In other words, the identified tokens correspond to the prediction candidates for a particular candidate entity. The identified tokens are encoded and sent via secure APIs to the post-processing module 504, thus enabling the data transmission to be secure and private information of the enterprise is not compromised.

As shown, the post-processing module 504 and the scoring engine 506 are deployed at a private enterprise cloud (see, 516) of the enterprise for post-processing the tokens to generate the candidate entities for the enterprise documents 508. Typically, the post-processing module 504 is configured to generate the final prediction for the candidate entities by combining the identified tokens from the enterprise documents 508. In other words, the post-processing module 504 is configured to identify the candidate tabular entities and the candidate non-tabular entities in the enterprise document 508 based at least on the prediction output of the trained ML models 216 which uses the document features. Thereafter, the trained ML models 216 provide the probability scores for the tokens corresponding to each candidate entities. More specifically, the ML models 216 compute the probability scores for the tokens corresponding to the candidate non-tabular entities and the candidate tabular entities. Thereafter, the probability scores provided by the ML models 216 are converted into the confidence score by the scoring engine 506. Further, the post-processing module 504 extracts the candidate tabular entities and the candidate non-tabular entities based at least on the confidence score given by the scoring engine 506.

More specifically, the post-processing module 504 may include separate algorithms to generate the final prediction of the candidate tabular entities and the candidate non-tabular entities. The candidate tabular and non-tabular entities are the structured data in the enterprise documents 508. The candidate non-tabular entities include the single-word entity, the multi-word entity, and the multi-line entity. Further, extracting the candidate tabular entities includes identifying a second set of tokens corresponding to the candidate tabular entities among the one or more tokens in the enterprise document. Thereafter, the post-processing module 504 determines a tabular area associated with the candidate tabular entities based at least on the second set of tokens. The post-processing module 504 further divides the tabular area into a plurality of rows and a plurality of columns and assigns each of the candidate tabular entities in a corresponding column of the plurality of columns. Further, extracting the candidate tabular entities and the candidate non-tabular entities from the enterprise documents 508 is explained in detail with reference to FIGS. 6A to 6C.

The scoring engine 506 may include scoring algorithms for computing a confidence score for each of the candidate non-tabular entities and the candidate tabular entities based at least on the probability scores computed by the ML models 216. In other words, the scoring engine 506 is configured to convert the probability scores to the confidence based at least on the trained ML models 216. The confidence score indicates the prediction confidence of the extraction engine 502. The confidence score can be computed using the following equation (Eq. 2):

$$\text{Confidence score} = 1/(1 + e^{\wedge}(-K*(P-P_0))) \tag{Eq. 2}$$

Where, P and $P_0$ represent the probability scores given by the ML models 216 associated with the tabular and non-tabular candidate entities and the threshold probability, respectively.

Further, the scoring engine 506 is configured to compute a document confidence score based on configurable weights of the individual candidate entities for a specific enterprise. In other words, the scoring engine 506 computes the document confidence score as the weighted average of the confidence score associated with each of the candidate non-tabular entities and the candidate tabular entities in the enterprise documents 508. The document confidence score indicates the accuracy of prediction of the candidate tabular entities and the candidate non-tabular entities from the enterprise documents 508 of the specific enterprise. Further, a robotic process automation (RPA) module 510 processes the enterprise documents 508 for straight-through processing (STP) based at least on the document confidence score associated with the enterprise documents 508.

Additionally, the scoring engine 506 may access an enterprise master database 512 associated with a particular enterprise. The enterprise master database 512 stores the properties of the enterprise documents 508 of different document formats associated with a particular vendor of the enterprise. The enterprise master database 512 may store identification text i.e. the text information across all the documents of the same document format and the information related to the candidate entities that are to be extracted from each document format. The server system 200 is configured to identify the enterprise master database 512 for providing access to the scoring engine 506. The server system 200 is configured to compare the text information or the tokens identified from the enterprise documents 508 with the identification text to identify the enterprise master database 512. More specifically, the server system 200 may determine the similarity between the text information of the tokens and the identification text. The server system 200 identifies the candidate entities in the enterprise master database 512 based on determining the similarity of the text information of the enterprise document to be greater than a set threshold similarity value.

The enterprise master database 512 is used to validate the structured data or the final prediction (i.e. the candidate tabular and non-tabular entities) of the post-processing module 504. More specifically, the scoring engine 506 with access to the enterprise master database 512 may alter (boost or attenuate) the confidence score associated with each of the candidate tabular and non-tabular entities of the enterprise documents 508.

Further, the entity extraction pipeline 500 includes a feedback loop 514 communicably coupled to the RPA module 510 and the post-processing module 504. Typically, the feedback loop 514 may contain statistical information and meta-data about the enterprise documents 508 that are already processed and is used to make the system learn from the patterns to improve the accuracy and the confidence scores. The feedback loop 514 may enable the user of the enterprise to provide feedback and corrections on the performance of the entity extraction pipeline 500. The post-processing module 504 is configured to flag the prediction of the candidate entities as incorrect based on the user feedback on the prediction. As such, the flagged predictions are accumulated, analyzed, and used to correct the wrong post-processing rules associated with the post-processing module 504 and re-train the ML models 216 in the next Incremental Training cycle for improving the accuracy of the candidate entity prediction.

In one scenario, the feedback loop 514 may receive feedback related to the document formats. As such, the document format of the enterprise documents 508 may be determined unknown format when there is low extraction accuracy in extracting the candidate entities from the enterprise documents. The enterprise documents 508 of the unknown format may be further used to train the ML models 216 as explained above. In another scenario, an enterprise master database such as the enterprise master database 512 may be updated accordingly in real-time based on the feedback received through the feedback loop 514. For example, if an enterprise master database for the invoices has the information stored about the "Total Invoice Amount" to be in the range of $100-$120 and the predicted value for it is $230.00, the confidence score associated with the prediction of the "Total invoice amount" may be of lowered and the enterprise document will be flagged. In another scenario, the user may provide feedback via the feedback loop 514 related to the "Total Invoice Amount" predicted by the extraction engine 502 as correct. In this scenario, the enterprise master database will be updated with the candidate entity "Total invoice amount" with the new range as $100-$230. This ensures that the enterprise master database is updated in real-time and hence, maintaining the high extraction accuracy of the extraction engine 502.

Figure 6A:
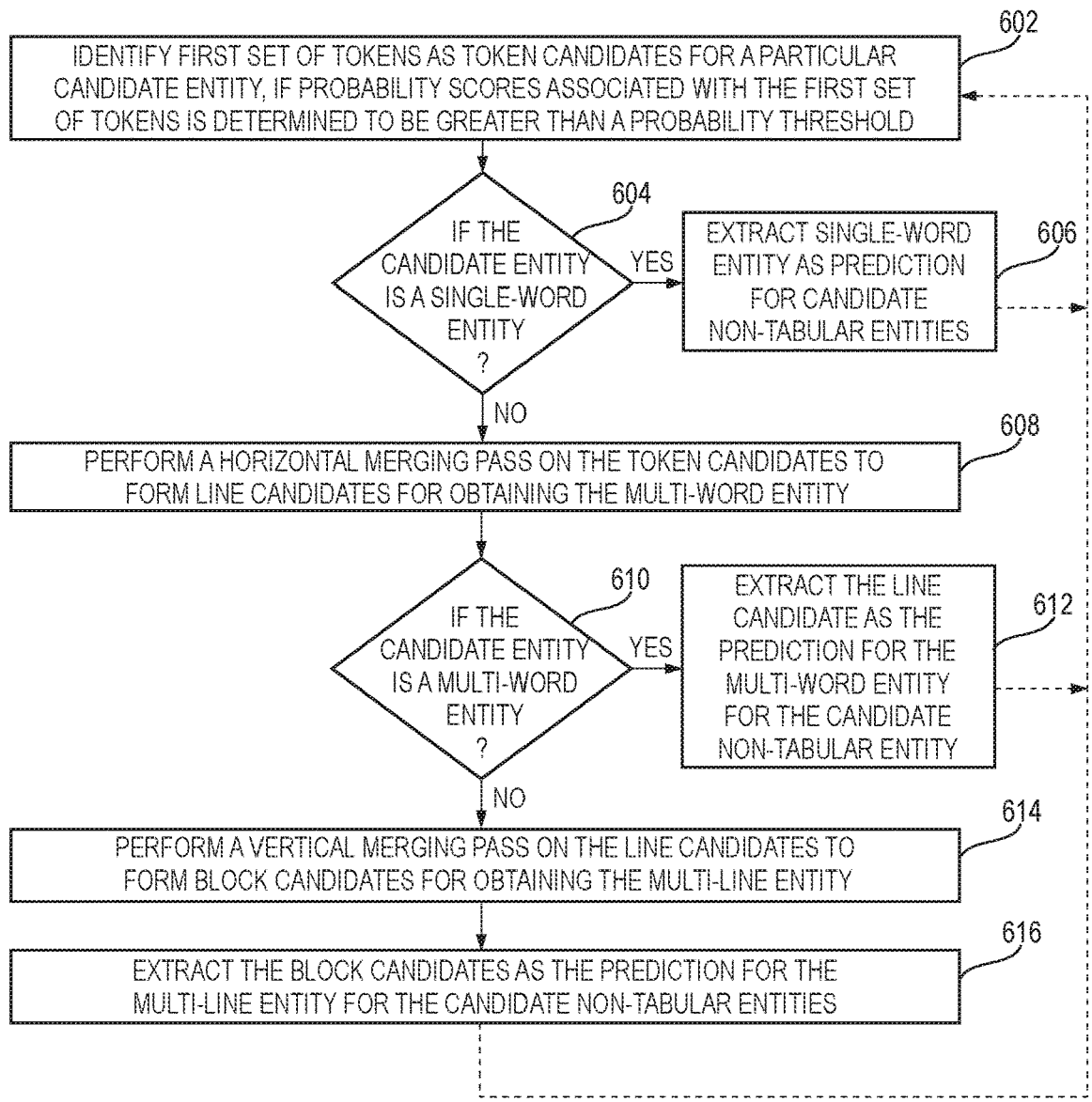
FIG. 6A represents a flow chart for post-processing candidate non-tabular entities from the enterprise document, in accordance with an embodiment of the present disclosure.

FIG. 6A represents a flow chart 600 for post-processing the candidate non-tabular entities from the enterprise documents, in accordance with an embodiment of the present disclosure. The process depicted in the flow chart 600 may be executed by, for example, the processor 206 of the server system 200. The sequence of operations of the flow chart 600 may not be necessarily executed in the same order as they are presented. Further, one or more operations may be grouped and performed in the form of a single step, or one operation may have several sub-steps that may be performed in parallel or a sequential manner.

At 602, a first set of tokens corresponding to each of the candidate non-tabular entities associated with the enterprise document are identified. More specifically, the post-processing module 504 identifies the first set of tokens as the token candidates for the particular candidate entity, if the probability scores associated with the first set of tokens is determined to be greater than a probability threshold.

At 604, the post-processing module 504 checks whether the candidate entity is a single-word entity or not.

At 606, the tokens among the first set of tokens are identified as the single-word entity for the candidate non-tabular entity. Further, if the candidate entity is not a single-word entity, step 608 is performed.

At 608, a horizontal merging pass is performed on the token candidates to form line candidates for obtaining the multi-word entity. In other words, the post-processing module 504 performs the horizontal merging pass on the token candidates to form the line candidates, if a horizontal distance (x-coordinates) is less than a horizontal merging threshold value. At 610, the post-processing module 504 checks whether the candidate entity is a multi-word entity or not. At 612, the post-processing module 504 extracts the line candidate as the prediction for the multi-word entity for the candidate non-tabular entity. Further, if the candidate entity is not the multi-word entity, step 614 is performed.

At 614, a vertical merging pass is performed on the line candidates to form block candidates for obtaining the multi-line entity. More specifically, the post-processing module 504 performs the vertical merging pass on the line candidates to form the block candidates, if a vertical distance (y-coordinates) is less than a vertical merging threshold value. At 616, the post-processing module 504 extracts the block candidates as the prediction for the multi-line entity for the candidate non-tabular entities. Further, once the candidate single-word, multi-word and multi-line entities are extracted at steps 606, 612 and 616, respectively, step 602 is repeated to extract other candidate non-tabular entities.

Figure 6B:
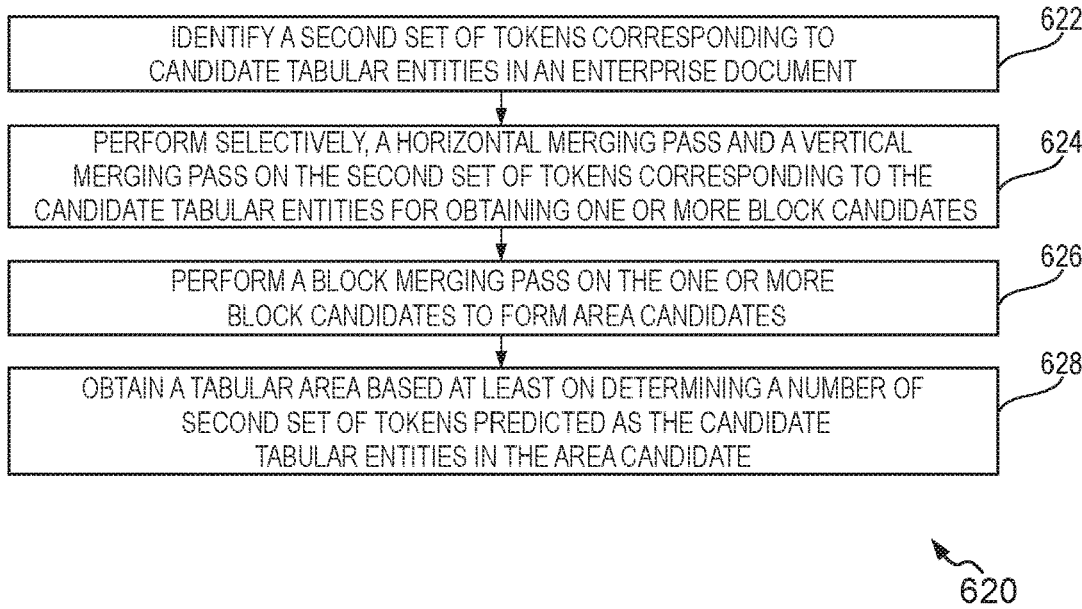
FIG. 6B represents a flow chart for post-processing candidate tabular entities to identify a tabular area in the enterprise document, in accordance with an embodiment of the present disclosure.

FIG. 6B represents a flow chart 620 for post-processing the candidate tabular entities to identify the tabular area associated with the candidate tabular entities in the enterprise documents, in accordance with an embodiment of the present disclosure. The process depicted in the flow chart 620 may be executed by, for example, the processor 206 of the server system 200. The sequence of operations of the flow chart 620 may not be necessarily executed in the same order as they are presented. Further, one or more operations may be grouped and performed in the form of a single step, or one operation may have several sub-steps that may be performed in parallel or in a sequential manner.

At 622, the second set of tokens corresponding to the candidate tabular entities in the enterprise document are identified. More specifically, the post-processing module 504 identifies the second set of tokens among the one or more tokens in the enterprise document. The second set of tokens corresponds to the candidate tabular entities in the enterprise document.

At 624, the post-processing module 504 selectively performs the horizontal merging pass and the vertical merging pass on the second set of tokens corresponding to the candidate tabular entities for obtaining one or more block candidates. The one or more block candidates are obtained based at least on determining a horizontal distance and a vertical distance associated with the second set of tokens to be less than a horizontal merging threshold value and a vertical merging threshold value, respectively.

At 626, a block merging pass on the one or more block candidates is performed to form area candidates. The post-processing module 504 performs the block merging pass on the block candidates based at least on a block merging threshold value to form the area candidates. More specifically, the area candidates are obtained by merging the block candidates that are less than the block merging threshold value away from each other.

At 628, the post-processing module 504 obtains the tabular area based at least on determining the number of second set of tokens predicted as the candidate tabular entities in the area candidate. More specifically, the post-processing module 504 determines the area candidate that includes the maximum number of second set of tokens predicted as the candidate tabular entities for obtaining the tabular area.

Figure 6C:
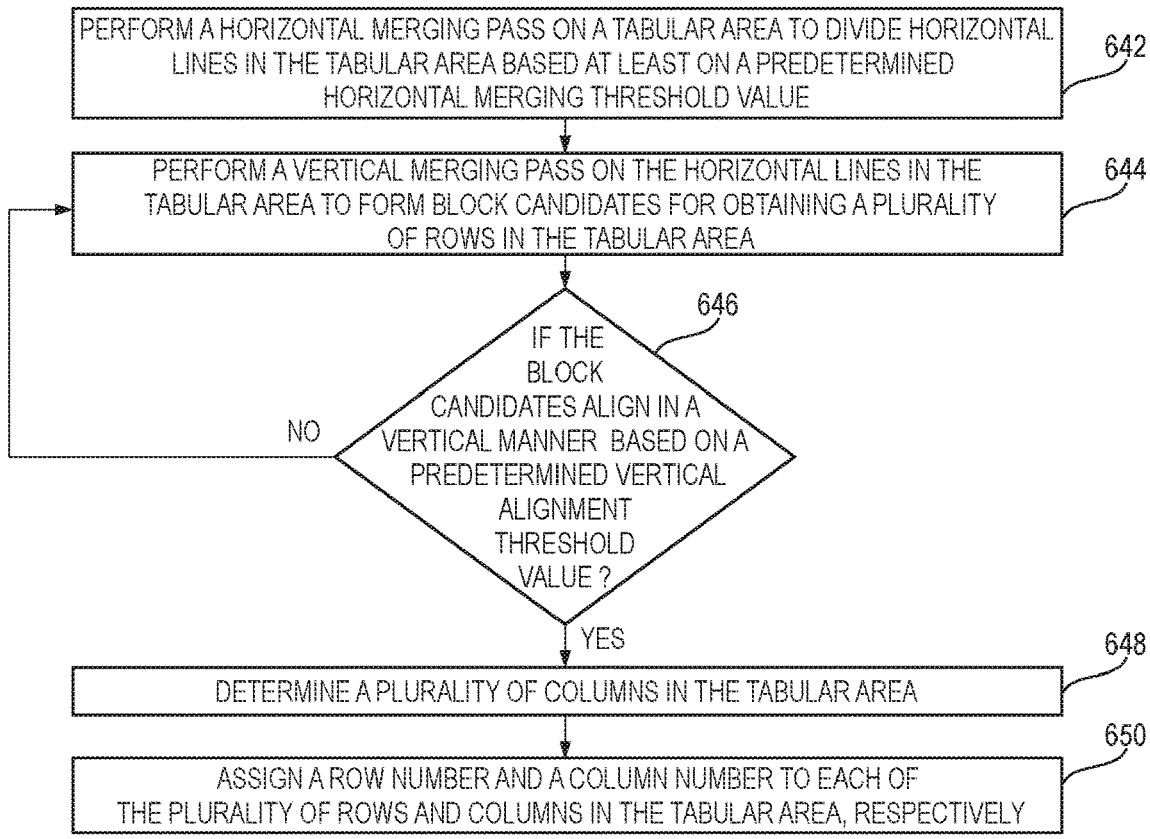
FIG. 6C represents a flow chart for post-processing the candidate tabular entities to identify columns and rows in the tabular area, in accordance with an embodiment of the present disclosure.

FIG. 6C represents a flow chart 640 for post-processing the candidate tabular entities to identify the plurality of rows and a plurality of columns in the tabular area associated with the candidate tabular entities in the enterprise documents, in accordance with an embodiment of the present disclosure. The process depicted in the flow chart 640 may be executed by, for example, the processor 206 of the server system 200. The sequence of operations of the flow chart 640 may not be necessarily executed in the same order as they are presented. Further, one or more operations may be grouped and performed in the form of a single step, or one operation may have several sub-steps that may be performed in parallel or a sequential manner.

At 642, the horizontal merging pass is performed on the tabular area to divide horizontal lines in the tabular area. More specifically, the post-processing module 504 may initialize a predetermined horizontal merging threshold value for performing the horizontal merging pass. For instance, the predetermined horizontal merging threshold value may be initialized with a value of 1. The post-processing module 504 performs the horizontal merging pass on the tabular area to divide the horizontal lines based at least on the predetermined horizontal merging threshold value. The horizontal merging pass on the tabular area provides the candidate tabular entities which overlap horizontally to form a single horizontal line.

At 644, the vertical merging pass is performed on the horizontal lines in the tabular area to form block candidates for obtaining the plurality of rows in the tabular area. The post-processing module 504 merges the horizontal lines to form blocks that serve as the rows of the tabular area.

At 646, the post-processing module 504 checks if the block candidates in the rows aligns in a vertical manner based at least on a predetermined vertical alignment threshold value. At 648, the plurality of columns in the tabular area is determined, if the block candidates in the rows align in the vertical manner. More specifically, the rows are further divided into columns by checking the vertical alignment (i.e. left, right, and center Alignment) of the blocks in the rows. Further, the post-processing module 504 determines the column based at least on the vertical alignment of the blocks. Further, if the block candidates in the rows aligns do not satisfy the predetermined vertical alignment threshold value, then the step 644 is repeated for determining the vertical alignment for each block in the tabular area. At 650, the post-processing module 504 assigns a row number and a column number to each of the plurality of rows and columns in the tabular area, respectively. It is to be noted that, each column in the tabular area represents a single candidate tabular entity. Each column is assigned with a corresponding candidate tabular entity, once the tabular area is divided into rows and columns.

Figure 7:
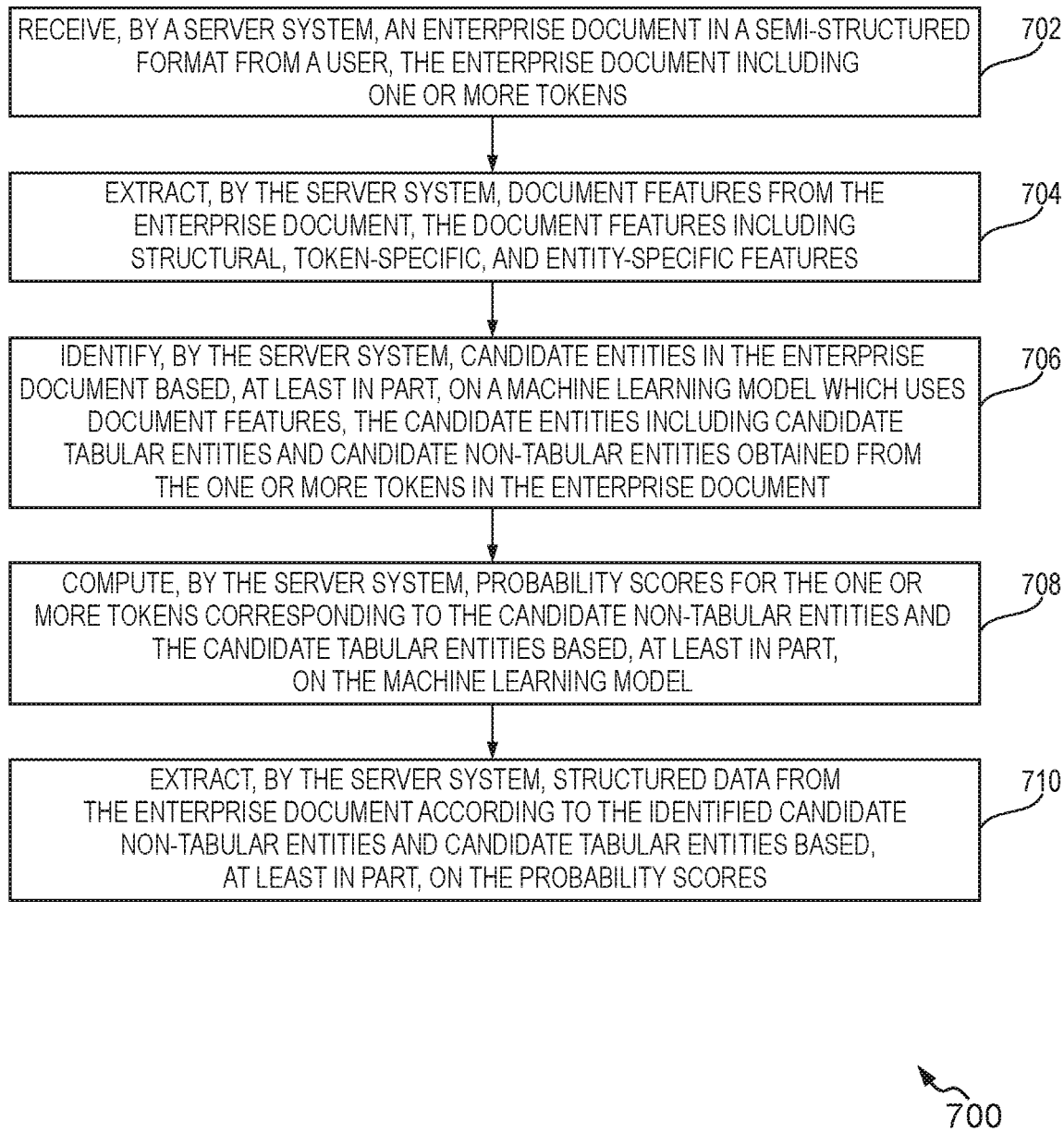
FIG. 7 illustrates a flow diagram of a computer-implemented method for extracting the candidate entities from the enterprise document, in accordance with an embodiment of the present disclosure.

FIG. 7 illustrates a flow diagram of a computer-implemented method 700 for extracting the candidate entities from the enterprise documents, in accordance with an embodiment of the present disclosure. The method 700 depicted in the flow diagram may be executed by, for example, the processor 206 of the server system 200. Operations of the flow diagram of the method 700, and combinations of operation in the flow diagram of the method 700, may be implemented by, for example, hardware, firmware, a processor, circuitry, and/or a different device associated with the execution of software that includes one or more computer program instructions. It is noted that the operations of the method 700 can be described and/or practiced by using a system other than these server systems. The method 700 starts at operation 702.

At operation 702, the method 700 includes receiving, by the server system 200, an enterprise document in a semi-structured format from a user. The enterprise document includes one or more tokens.

At operation 704, the method 700 includes extracting, by the server system 200, document features from the enterprise document. The document features include structural, token-specific, and entity-specific features.

At operation 706, the method 700 includes identifying, by the server system 200, candidate entities in the enterprise document based, at least in part, on a machine learning model which uses the document features. The candidate entities include one of the candidate tabular entities and candidate non-tabular entities that are obtained from the one or more tokens in the enterprise document. Further, the machine learning model may be a supervised machine learning model that can be trained based, at least in part, on decision tree algorithms, and ensemble techniques as explained above.

At operation 708, the method 700 includes computing, by the server system 200, the probability scores for the one or more tokens corresponding to the candidate non-tabular entities and the candidate tabular entities, based, at least in part, on the machine learning model.

At operation 710, the method 700 includes extracting, by the server system 200, structured data from the enterprise document according to the identified candidate non-tabular entities and candidate tabular entities based, at least in part, on the probability scores.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   receiving, by a server system, an enterprise document in a semi-structured format from a user, the enterprise document comprising one or more tokens;
   extracting, by the server system, document features from the enterprise document, the document features comprising structural, token-specific, and entity-specific features;

identifying, by the server system, candidate entities in the enterprise document based, at least in part, on a machine learning model which uses the document features, the candidate entities comprising candidate tabular entities and candidate non-tabular entities obtained from the one or more tokens in the enterprise document;

computing, by the server system, probability scores for the one or more tokens corresponding to the candidate non-tabular entities and the candidate tabular entities, based, at least in part, on the machine learning model; and extracting, by the server system, structured data from the enterprise document according to the identified candidate non-tabular entities and candidate tabular entities based, at least in part, on the probability scores.

2. The computer-implemented method as claimed in claim 1, further comprising:

computing, by the server system, a confidence score for each of the candidate non-tabular entities and the candidate tabular entities based, at least in part, on the probability scores associated with the candidate tabular entities and candidate the non-tabular entities; and computing, by the server system, a document confidence score as weighted average of the confidence score associated with each of the candidate non-tabular entities and the candidate tabular entities, the document confidence score indicative of accuracy of prediction of the candidate tabular entities and the candidate non-tabular entities from the enterprise document.

3. The computer-implemented method as claimed in claim 1, wherein the candidate non-tabular entities comprise at least one of a single word entity, a multi-word entity and a multiline entity.

4. The computer-implemented method as claimed in claim 3, wherein extracting the candidate non-tabular entities further comprises:

identifying, by the server system, a first set of tokens from the one or more tokens associated with the enterprise document based at least on determining the probability scores associated with the candidate non-tabular entities is greater than a probability threshold, the first set of tokens corresponding to token candidates for the candidate non-tabular entities in the enterprise document;

determining, by the server system, the single-word entity among the first set of tokens;

performing, by the server system, a horizontal merging pass on the token candidates to form line candidates for obtaining the multi-word entity, wherein the multi-word entity is obtained based at least on determining a horizontal distance between each of the line candidates to be less than a horizontal merging threshold value; and performing, by the server system, a vertical merging pass on the line candidates to form block candidates for obtaining the multi-line entity, wherein the multi-line entity is obtained based at least on determining a vertical distance between the block candidates to be less than a vertical merging threshold value.

5. The computer-implemented method as claimed in claim 1, wherein extracting the candidate tabular entities from the enterprise document further comprises:

identifying, by the server system, a second set of tokens among the one or more tokens corresponding to the candidate tabular entities;

determining, by the server system, a tabular area associated with the candidate tabular entities based, at least in part, on the second set of tokens;

performing, by the server system, division of the tabular area into a plurality of rows and a plurality of columns; and assigning, by the server system, each of the candidate tabular entities in a corresponding column of the plurality of columns.

6. The computer-implemented method as claimed in claim 5, wherein identifying the tabular area associated with the candidate tabular entities further comprises:

identifying, by the server system, the second set of tokens corresponding to the candidate tabular entities based at least on determining the probability scores corresponding to the candidate tabular entities to be greater than the probability threshold;

performing selectively, by the server system, a horizontal merging pass and a vertical merging pass on the second set of tokens corresponding to the candidate tabular entities for obtaining one or more block candidates, wherein the one or more block candidates are obtained based at least on determining a horizontal distance and a vertical distance associated with the second set of tokens to be less than a horizontal merging threshold value and a vertical merging threshold value, respectively; and upon obtaining the one or more block candidates, performing, by the server system, a block merging pass on the one or more block candidates based at least on a block merging threshold value to obtain the tabular area.

7. The computer-implemented method as claimed in claim 5, wherein performing division of the tabular area into the plurality of rows and the plurality of columns further comprises:

performing, by the server system, the horizontal merging pass based at least on a predetermined horizontal merging threshold value to align the second set of tokens corresponding to the candidate tabular entities in a horizontal manner within the tabular area, thereby obtaining horizontal lines in the tabular area;

performing, by the server system, the vertical merging pass on the horizontal lines in the tabular area to form block candidates for obtaining the plurality of rows in the tabular area;

verifying, by the server system, if the block candidates in the plurality of rows align in a vertical manner based, at least in part, on a pre-determined vertical alignment threshold value; and upon successful verification, determining, by the server system, the plurality of columns in the tabular area.

8. The computer-implemented method as claimed in claim 1, wherein training the machine learning (ML) model comprises:

inputting, by the server system, a training dataset comprising a plurality of enterprise documents;

facilitating, by the server system, pre-processing of the training dataset for enabling extraction of the plurality of tokens from the training dataset;

encoding, by the server system, a document format associated with the plurality of enterprise documents based, at least in part, on the document properties associated with the plurality of tokens, the document properties comprising one of a layout property, a word-shape property, and a label property;

computing, by the server system, a token similarity score for each pair of overlapping tokens in each of the plurality of enterprise documents, and a label similarity score based at least on a first spatial similarity score and a first similarity score for the tokens corresponding to the labels of the same candidate entities of the enterprise document;

computing, by the server system, an overall token similarity score and an overall label similarity score based at least on determining weighted average of the token similarity score for each pair of overlapping tokens and the label similarity score associated with the pair of tokens that are labels of the same candidate entities, respectively; and determining, by the server system, a document similarity score indicative of similarity between each of the plurality of enterprise documents based at least on the weighted average of the overall token similarity score and the overall label similarity score.

9. The computer-implemented method as claimed in claim 8, further comprising:
generating, by the server system, a document cluster graph based, at least in part, on the document similarity score associated with each of the plurality of enterprise documents; and
assigning, by the server system, a document label indicative of a document format for each of the plurality of enterprise documents based at least on the document similarity score, wherein the document label is marked as unknown format, if the document similarity score associated with an enterprise document of the plurality of enterprise document is determined to be less than a threshold document similarity score, and
wherein the document label is marked as known format, if the document similarity score associated with enterprise document of the plurality of enterprise documents is determined to be greater than the threshold document similarity score.

10. The computer-implemented method as claimed in claim 1, further comprising:
facilitating, by the server system, tagging of the plurality of tokens into corresponding candidate entity for the enterprise document;
determining, by the server system, a second similarity score associated with the text information of each of the plurality of tokens that are tagged as the candidate entity based at least on a word-shape property;
determining, by the server system, a second spatial similarity score of each of the plurality of tokens that are tagged as the candidate entity;
computing, by the server system, a tagged data similarity score based at least on the second spatial similarity score and the second similarity score associated with each of the plurality of tokens that are tagged as the same candidate entity in the enterprise document; and
computing, by the server system, an intra-format tagged data similarity score as weighted average of the tagged data similarity score determined upon tagging each of the plurality of tokens into the corresponding candidate entity in the enterprise document, the intra-format tagged data similarity score indicative of accuracy of data tagging of each of the plurality of tokens into corresponding entity for the enterprise document.

11. A server system, comprising:
a communication interface;
a memory comprising executable instructions; and
a processor communicably coupled to the communication interface and the memory, the processor configured to cause the server system to perform at least:
receive an enterprise document in a semi-structured format from a user, the enterprise document comprising one or more tokens;
extract document features from the enterprise document, the document features comprising structural, token-specific, and entity-specific features;
identify candidate entities in the enterprise document based, at least in part, on a machine learning model which uses the document features, the candidate entities comprising candidate tabular entities and candidate non-tabular entities obtained from the one or more tokens in the enterprise document;
compute probability scores for the one or more tokens corresponding to the candidate non-tabular entities and the candidate tabular entities, based, at least in part, on the machine learning model; and
extract structured data from the enterprise document according to the identified candidate non-tabular entities and candidate tabular entities based, at least in part, on the probability scores.

12. The server system as claimed in claim 11, wherein the server system is further caused to:
compute a confidence score for each of the candidate non-tabular entities and the candidate tabular entities based, at least in part, on the probability scores associated with the candidate tabular entities and candidate the non-tabular entities; and
compute a document confidence score as weighted average of the confidence score associated with each of the candidate non-tabular entities and the candidate tabular entities, the document confidence score indicative of accuracy of prediction of the candidate tabular entities and the candidate non-tabular entities from the enterprise document.

13. The server system as claimed in claim 11, wherein the candidate non-tabular entities comprise at least one of a single word entity, a multi-word entity and a multi-line entity.

14. The server system as claimed in claim 13, wherein the server system is further caused to:
identify a first set of tokens from the one or more tokens associated with the enterprise document based at least on determining the probability scores associated with the candidate non-tabular entities is greater than a probability threshold, the first set of tokens corresponding to token candidates for the candidate non-tabular entities in the enterprise document;
determine the single-word entity among the first set of tokens;
perform a horizontal merging pass on the token candidates to form line candidates for obtaining the multi-word entity, wherein the multi-word entity is obtained based at least on determining a horizontal distance between each of the line candidates to be less than a horizontal merging threshold value; and
perform a vertical merging pass on the line candidates to form block candidates for obtaining the multi-line entity, wherein the multi-line entity is obtained based at least on determining a vertical distance between the block candidates to be less than a vertical merging threshold value.

15. The server system as claimed in claim 11, wherein the server system is further caused to:

identify a second set of tokens among the one or more tokens corresponding to the candidate tabular entities;

determine a tabular area associated with the candidate tabular entities based, at least in part, on the second set of tokens;

perform division of the tabular area into a plurality of rows and a plurality of columns; and assign each of the candidate tabular entities in a corresponding column of the plurality of columns.

16. The server system as claimed in claim 15, wherein the server system is further caused to:

identify the second set of tokens corresponding to the candidate tabular entities based at least on determining the probability scores corresponding to the candidate tabular entities to be greater than the probability threshold;

perform selectively, a horizontal merging pass and a vertical merging pass on the second set of tokens corresponding to the candidate tabular entities for obtaining one or more block candidates, wherein the one or more block candidates are obtained based at least on determining a horizontal distance and a vertical distance associated with the second set of tokens to be less than a horizontal merging threshold value and a vertical merging threshold value, respectively; and upon obtaining the one or more block candidates, perform a block merging pass on the one or more block candidates based at least on a block merging threshold value to obtain the tabular area.

17. The server system as claimed in claim 15, wherein the server system is further caused to:

perform the horizontal merging pass based at least on a predetermined horizontal merging threshold value to align the second set of tokens corresponding to the candidate tabular entities in a horizontal manner within the tabular area, thereby obtaining horizontal lines in the tabular area;

perform the vertical merging pass on the horizontal lines in the tabular area to form block candidates for obtaining the plurality of rows in the tabular area;

verify, if the block candidates in the plurality of rows align in a vertical manner based, at least in part, on a pre-determined vertical alignment threshold value; and upon successful verification, determine the plurality of columns in the tabular area.

18. The server system as claimed in claim 11, wherein training the machine learning (ML) model comprises:

input a training dataset comprising a plurality of enterprise documents;

facilitate pre-processing of the training dataset for enabling extraction of the plurality of tokens from the training dataset;

encode a document format associated with the plurality of enterprise documents based, at least in part, on the document properties associated with the plurality of tokens, the document properties comprising one of a layout property, a word-shape property, and a label property;

compute a token similarity score for each pair of overlapping tokens in each of the plurality of enterprise documents, and a label similarity score based at least on a first spatial similarity score and a first similarity score for the tokens corresponding to the labels of the same candidate entities of the enterprise document;

compute an overall token similarity score and an overall label similarity score based at least on determining weighted average of the token similarity score for each pair of overlapping tokens and the label similarity score associated with the pair of tokens that are labels of the same candidate entities, respectively; and determine a document similarity score indicative of similarity between each of the plurality of enterprise documents based at least on the weighted average of the overall token similarity score and the overall label similarity score.

19. The server system as claimed in claim 18, wherein the server system is further caused to:

generate a document cluster graph based, at least in part, on the document similarity score associated with each of the plurality of enterprise documents; and assign a document label indicative of a document format for each of the plurality of enterprise documents based at least on the document similarity score, wherein the document label is marked as unknown format, if the document similarity score associated with an enterprise document of the plurality of enterprise document is determined to be less than a threshold document similarity score, and wherein the document label is marked as known format, if the document similarity score associated with enterprise document of the plurality of enterprise documents is determined to be greater than the threshold document similarity score.

20. The server system as claimed in claim 11, wherein the server system is further caused to:

facilitate tagging of the plurality of tokens into corresponding candidate entity for the enterprise document;

determine a second similarity score associated with the text information of each of the plurality of tokens that are tagged as the candidate entity based at least on a word-shape property;

determine a second spatial similarity score of each of the plurality of tokens that are tagged as the candidate entity;

compute a tagged data similarity score based at least on the second spatial similarity score and the second similarity score associated with each of the plurality of tokens that are tagged as the same candidate entity in the enterprise document; and compute an intra-format tagged data similarity score as weighted average of the tagged data similarity score determined upon tagging each of the plurality of tokens into the corresponding candidate entity in the enterprise document, the intra-format tagged data similarity score indicative of accuracy of data tagging of each of the plurality of tokens into corresponding entity for the enterprise document.

* * * * *